US008793188B2

(12) United States Patent
Larkin

(10) Patent No.: US 8,793,188 B2
(45) Date of Patent: Jul. 29, 2014

(54) ELECTRONIC TRANSACTION FRAUD PREVENTION

(75) Inventor: Colin Larkin, Dublin (IE)

(73) Assignee: Moqom Limited (IE)

( * ) Notice: Subject to any disclaimer, the term of this patent is extended or adjusted under 35 U.S.C. 154(b) by 132 days.

(21) Appl. No.: 13/133,820

(22) PCT Filed: Dec. 10, 2009

(86) PCT No.: PCT/IE2009/000088
§ 371 (c)(1),
(2), (4) Date: Aug. 2, 2011

(87) PCT Pub. No.: WO2010/067342
PCT Pub. Date: Jun. 17, 2010

(65) Prior Publication Data
US 2011/0276489 A1    Nov. 10, 2011

(30) Foreign Application Priority Data
Dec. 10, 2008    (IE) .................................... S2008/0977

(51) Int. Cl.
*G06Q 40/00* (2012.01)
*G06Q 20/20* (2012.01)
*G06Q 40/02* (2012.01)
*G06Q 20/40* (2012.01)

(52) U.S. Cl.
CPC ................ *G06Q 20/20* (2013.01); *G06Q 40/02* (2013.01); *G06Q 20/4016* (2013.01)
USPC ............................................. 705/44; 705/35

(58) Field of Classification Search
CPC .................................................. G06Q 20/4016
USPC ........................................................... 705/35
See application file for complete search history.

(56) References Cited

U.S. PATENT DOCUMENTS

| 6,088,683 | A | 7/2000 | Jalili |
| 2002/0133462 | A1 | 9/2002 | Shteyn |
| 2004/0254868 | A1 * | 12/2004 | Kirkland et al. ................. 705/35 |
| 2011/0173122 | A1 * | 7/2011 | Singhal ............................ 705/44 |

FOREIGN PATENT DOCUMENTS

EP           1455317 A2    9/2004

* cited by examiner

*Primary Examiner* — William Rankins
(74) *Attorney, Agent, or Firm* — Volpe and Koenig, P.C.

(57) ABSTRACT

A card fraud prevention network and method are provided. The network includes a plurality of network-connected data processing terminals, including at least one server. Electronic authorization requests are received for authorizing the processing of an electronic transaction associated with a cardholder's card data or account data. The received requests are filtered according to predetermined or configurable criteria. A cardholder terminal is identified, to which the request is sent in order to notify the cardholder that processing of an electronic transaction is proposed, a parameter of which is the cardholder's card data or account data. Means are provided for interrupting processing of the, or any further, electronic transaction with that card data or account data, should the request correspond to an unauthorised transaction.

7 Claims, 8 Drawing Sheets

| Terminal ID | Description | Last Fraud Time | Fraud Count |
|---|---|---|---|
| 665577 | ATM – 10 Grafton Street | 2008-22-10 12:30:35 | 12 |
| 123456 | Flower Shop Dawson Street | 2008-20-10 17:00:10 | 5 |
| 987656 | ATM – Upper Duke Lanet | 2008-20-09 00:13:13 | 3 |
| 111222 | ATM – Anne Street South | 2008-22-10 11:05:43 | 1 |

Figure 15

ELECTRONIC TRANSACTION FRAUD PREVENTION

FIELD OF THE INVENTION

The invention relates to the prevention of electronic transaction fraud. In particular the invention relates to an apparatus and method for preventing electronic transaction fraud.

BACKGROUND TO THE INVENTION

Electronic transaction fraud, particularly payment card fraud, is an ever-increasing problem for financial institutions, such as credit card companies and banks. The introduction of electronic memory means ('CHIP') on cards, in association with personal identification numbers ('PIN') in recent years was aimed at eliminating such crime. Although card fraud in certain contexts has declined, card fraud in other areas has increased significantly.

Examples of various types of card fraud include the following.

Card-Not-Present (CNP)

Card-Not-Present (CNP) refers to Internet, phone and mail order fraud. Fraud happens when stolen card details are used pay for services and goods over the phone, the Internet or by mail order. The main problem for fighting this type of fraud efficiently, is that the cardholder is not present at the time of the fraud, therefore does not know about the fraud until after the fraud has been committed, as and when a statement of transactions for card is checked and evidences the fraudulent use.

Counterfeit Fraud

Counterfeit Fraud refers to situations wherein the magnetic stripe details of a card are fraudulently acquired, and one or more counterfeit cards, which are fake replicas of the card, are created therefrom. Stolen card details are transmitted to overseas accomplices, where counterfeit cards are created and used in areas where CHIP-and-PIN technology is yet to be introduced.

Lost and Stolen Card Fraud

Lost and stolen card fraud refers to fraudulent purchases committed with cards that have been lost by, or stolen from, the cardholder. Most lost and stolen card fraud takes place in shops that have yet to introduce CHIP-and-PIN technology or equipment: in such instances, a fraudulent user does not require a PIN and can use the card before the cardholder has reported the card lost or stolen. Some technologies are in place to counteract this type of fraud, for instance automated analysis of spending patterns performed upon customer card accounts. This type of fraud has declined in recent years, but remains important.

Mail Non-Receipt Fraud

Mail non-receipt fraud refers to fraudulent purchases committed with cards that have been stolen after card companies issue them and before the cardholders receive them, usually by intercepting mail containing a new or replacement card and/or PIN. This may occur in apartment buildings, or at the time of moving lodgings where the cardholder fails to redirect their mail in good time. This type of fraud has also declined in recent years, because fewer cards are issued and cardholders routinely maintain the same PIN for successive cards, such that a new PIN is not sent out.

Card ID Theft

Card ID theft refers to situations wherein new card accounts are opened with financial institutions, or existing card accounts are hijacked, on the evidence of fraudulently obtained cards or card details, along with fraudulently obtained personal information. Two main types of Card ID theft are known:

Application fraud corresponds to the use of stolen or fake documents to open a card account in another person's name. Criminals may try to steal documents such as utility bills and bank statements to build up sufficient convincing personal information, or may use counterfeit documents for identification purposes; and Account take-over corresponds to attempts to take over another person's account, first by gathering information about the intended victim, then contacting their financial institution or credit card issuer whilst masquerading as the genuine cardholder. Funds may then be transferred out of the account, or the address on the account may be changed and new or replacement cards may be ordered then sent to the changed address.

ATM Fraud

ATM Fraud refers to the fraudulent copying of the data stored on a card's magnetic stripe and recording of the PIN, while a cardholder uses an Automatic Teller Machine. Three main types of ATM Fraud are known:

Shoulder surfing refers to the practice of looking over a cardholder shoulder to observe and obtain the PIN, then stealing the card at a later occasion using distraction.

Device Card tapping refers to the practice of inserting a device into an ATM slot, which retains the card. A cardholder is then tricked into inputting the PIN again and, when the cardholder leaves the ATM, the card can be stolen then used to withdraw funds with the obtained PIN.

ATM skimming refers to the practice of attaching a device to an ATM, which records the data stored on a card's magnetic stripe as it is inserted into the ATM slot, and hiding a miniature camera overlooking the user input keys to observe and capture the PIN as it is input by a cardholder. The data obtained may be used to create counterfeit cards with genuine data encoded on their magnetic stripes, which can be used to withdraw funds with the obtained PIN, generally from cash machines overseas.

Phishing

Phishing refers to the fraudulent acquisition of personal information such as usernames, passwords and credit card details from cardholders, by masquerading as an existing service supplier or trustworthy entity in an electronic communication. Communications, typically emails, purporting to be sent by popular social websites, auction sites, online payment processors, financial services providers or IT administrators are used to lure unsuspecting users into inputting personal information at fraudulent websites, the look and feel of which is substantially identical to the authentic, original website.

Due to the introduction of CHIP-and-PIN, card fraud has shifted to contexts wherein this authentication technology is not yet in use, such as the Internet and some overseas countries. Card fraud at the expense of retailers has declined whenever and wherever CHIP-and-PIN has been introduced, however fraudulent Card-Not-Present transactions are increasing.

It is therefore an object of the invention to provide a fraud prevention apparatus and method to at least mitigate the above problems.

SUMMARY OF THE INVENTION

According to a first aspect of the present invention, there is provided an apparatus for preventing electronic transaction fraud, comprising a plurality of network-connected data processing terminals, including at least one server, means for receiving an electronic authorisation request at the server from a first data processing terminal, wherein the request is for authorising the processing of an electronic transaction associated with a cardholder's card data or account data;

means for filtering the received request according to predetermined filtering criteria;

means for identifying at least a second data processing terminal as a cardholder device;

means for sending the request to the cardholder device, to notify the cardholder that processing of an electronic transaction is proposed, a parameter of which is said cardholder's card data or account data; and means for receiving interrupt data from the second terminal and for interrupting processing of the, or any further, electronic transaction with that card data or account data.

The individual most apt to detect fraud in relation to a payment card at the earliest possible opportunity, is the card's cardholder, who knows precisely whether he is conducting a transaction or not at any given time. The apparatus according to the invention advantageously allows a cardholder to receive notification of an impending electronic transaction involving the cardholder's payment card or account, as the transaction happens in real time or off-line. The apparatus according to the invention advantageously further allows the cardholder to interrupt processing of the, or any further, electronic transaction with that card data or account data, if the notification is for a fraudulent transaction.

The apparatus preferably further comprises means for allowing processing of the electronic transaction. This aspect of the apparatus advantageously subjects the processing of the electronic transaction to the cardholder's express approval independently of the first terminal's own operating configuration, the means for allowing embodying a redundant security mechanism when combined with, for instance, inputting a Personal identification Number in a merchant terminal or cash dispensing terminal.

The plurality of network-connected data processing terminals preferably includes at least the first and second data processing terminals and the server.

The first data processing terminal data and the server may be connected by a first network, the second data processing terminal data and the server may be connected by the first or a second network.

The first or second network is preferably selected from the group comprising a public switched telephone network, a cellular telecommunication network, a wide area network, a local area network, a wireless local area network, a virtual private network and an interbank network.

The first data processing terminal is preferably selected from the group comprising an electronic point of sale terminal, an electronic card processing terminal, an automatic teller machine, a telephone, a cellular telephone, a radiotelephone, a portable computing device, a desktop computing device.

The at least second data processing terminal is preferably selected from the group comprising a telephone, a cellular telephone, a radiotelephone, a pager, a personal digital assistant, a portable computing device, a desktop computing device.

The means for identifying the at least second data processing terminal as a cardholder device preferably comprises a database storing at least, for each cardholder, card or account data associated with a network address of at least a second data processing terminal. The identifying means may advantageously identify a plurality of data processing terminals (for example a PC) as respective devices of a same cardholder, acting as a redundant security mechanism if the at least second terminal is unavailable for communication thereto due to unforeseen circumstances, to ensure the cardholder is still notified in the shortest possible period of time.

The means for filtering the received request according to predetermined filtering criteria comprises a filter engine.

The predetermined filtering criteria is preferably selected from data representative of any one, or a combination, of the group comprising a mandatory notification, an optional notification, a transaction amount threshold, a geographical position, a first data processing terminal type, a network type, a financial institution identifier, a merchant identifier.

The means for sending the request to the cardholder device preferably comprises any one, or a combination, selected from the group comprising messaging instructions stored and processed by the at least one server, a cellular messaging server, an interactive voice response apparatus.

The means for receiving interrupt data from the second terminal and interrupting processing of the electronic transaction comprises a combination of at least one selected from the group comprising messaging instructions stored and processed by the at least one server, a cellular messaging server and an interactive voice response apparatus, respectively receiving the interrupt data from the at least second terminal, and a transaction processing terminal.

The interrupt data is preferably any one, or a combination, selected from the group comprising a portion of card data, a portion of account data, a personal identification number, alphanumerical data representative of a user decision, digitized audio data representative of a user decision, a predetermined period of time.

The plurality of network-connected data processing terminals preferably further includes at least one security terminal operated by a state, official or private security organisation.

The apparatus preferably further includes means to automatically communicate interrupt data to the security terminal, whenever interrupt data is received from a second terminal for an electronic transaction. Since the apparatus allows the detection and the interruption of any fraudulent use of a card or account data in real-time, the interrupt data effectively doubles as fraud reporting data, and this embodiment of the apparatus advantageously communicates the interrupt data as fraud reporting data to relevant personnel within a sufficiently short time to try and apprehend those responsible for the reported transaction.

The means to automatically communicate data preferably further comprises aggregating means, for receiving the interrupt data and generating fraud reporting data corresponding to at least one selected from the group comprising a geographical position, a first data processing terminal type, a financial institution identifier, a merchant identifier, image data, audio data and video data, as a function of whether any such data is stored at the first data processing terminal and/or at the server in connection with the reported transaction.

The aggregating means preferably generates fraud reporting data as a combination of some or all of data corresponding to a geographical position, a first data processing terminal type, a financial institution identifier, a merchant identifier, image data, audio data and/or video data.

The at least one security terminal is preferably selected from the group comprising a telephone, a cellular telephone, a radiotelephone, a pager, a personal digital assistant, a portable computing device, a desktop computing device, a personal radio, a two-way radio, a mobile radio or computing device aboard a land vehicle, aircraft or ship, or a combination thereof.

According to another aspect of the present invention, there is provided a method of preventing electronic transaction fraud in a network comprising a plurality of network-connected data processing terminals, including at least one server, the method comprising the steps of receiving an electronic authorisation request at the server from a first data processing terminal, wherein the request is for authorising the processing of an electronic transaction associated with a cardholder's card data or account data;

filtering the received request according to predetermined filtering criteria;

identifying at least a second data processing terminal as a cardholder device;

sending the request to the cardholder device, to notify the cardholder that processing of an electronic transaction is proposed, a parameter of which is said cardholder's card data or account data; and interrupting processing of the, or any further, electronic transaction with that card data or account data.

The method preferably further comprises the step of allowing processing of the electronic transaction.

The method preferably further comprises the step of storing a database storing at least, for each cardholder, card or account data associated with a network address of at least a second data processing terminal.

The step of identifying preferably further comprises the step of identifying a plurality of data processing terminals as respective devices of a same cardholder.

The step of filtering the received request preferably further comprises the step of selecting data representative of any one, or a combination, of the group comprising a mandatory notification, an optional notification, a transaction amount threshold, a geographical position, a first data processing terminal type, a network type, a financial institution identifier, a merchant identifier.

The step of sending the request to the cardholder device preferably further comprises the step of selecting any one, or a combination, from the group comprising messaging instructions stored and processed by the at least one server, a cellular messaging server, an interactive voice response apparatus.

The step of interrupting processing of the electronic transaction preferably further comprises the steps of inputting interrupt data at the at least second terminal and communicating the interrupt data to any one, or a combination, selected from the group comprising messaging instructions stored and processed by the at least one server, a cellular messaging, for example SMS of WAP, server and an interactive voice response apparatus, respectively.

The method preferably comprises the further step of automatically communicating interrupt data to a security terminal, whenever interrupt data is received from a second terminal for an electronic transaction, wherein the security terminal is operated by a state, official or private security organisation.

The step of automatically communicating interrupt data preferably further comprises the steps of receiving the interrupt data and generating fraud reporting data corresponding to at least one selected from the group comprising a geographical position, a first data processing terminal type, a financial institution identifier, a merchant identifier, image data, audio data and video data, as a function of whether any such data is stored at the first data processing terminal and/or at the server in connection with the reported transaction.

The step of generating fraud reporting data preferably further comprises the step of aggregating a combination of some or all of data corresponding to a geographical position, a first data processing terminal type, a financial institution identifier, a merchant identifier, image data, audio data and/or video data.

The step of automatically communicating fraud reporting data preferably further comprises the step of selecting the recipient security terminal from the group comprising a telephone, a cellular telephone, a radiotelephone, a pager, a personal digital assistant, a portable computing device, a desktop computing device, a personal radio, a two-way radio, a mobile radio or computing device aboard a land vehicle, aircraft or ship, or a combination thereof.

According to still another aspect of the present invention, there is provided a method of preventing electronic transaction fraud in a network, comprising the steps of receiving notification of an electronic transaction request
replying to the notification with a SMS message containing a codeword and authentication code, and
automatically blocking a cardholder's payment card for future usage upon receipt of the codeword and authentication code.

According to still another aspect of the present invention, there is provided a method of preventing electronic transaction fraud in a network, comprising the steps of receiving notification of an electronic transaction request
replying to the notification with a WAP message containing a codeword and authentication code, and
automatically blocking a cardholder's payment card for future usage upon receipt of the codeword and authentication code.

The method further comprises the step of notifying the cardholder about the blocking of the card from future usage.

A further aspect of the invention provides a method of preventing electronic transaction fraud in a network, comprising the steps of contacting a phone number, routing to an interactive voice recognition system,
inputting a code word and authentication, by orally recognising the code word and authentication using speech recognition without human interaction, or keying in a selected digit and code combination, and
blocking the cardholder's payment card for future usage in response to the recognised code word and authentication or keyed in selected digit and code combination.

According to yet another aspect of the present invention, there is provided a set of instructions recorded on a carrier which, when processed by a data processing apparatus, adapts the apparatus to perform the method of preventing card fraud substantially according to any of the above recitals.

The carrier may be selected from the group comprising read-only memory means, random access memory means, optical data storage means, solid state data storage means, magnetic data storage means, electrical signal, optical signal.

The set of instructions may be selected from the group comprising source code, object code, compiled code, partially compiled code, executable code.

BRIEF DESCRIPTION OF THE DRAWINGS

The invention will be more clearly understood from the following description of an embodiment thereof, given by way of example only, with reference to the accompanying drawings, in which:

FIG. 15 illustrates the cardholder transaction notification report used to report back the status of each transaction using an outgoing E-Mail Report plug-in.

DETAILED DESCRIPTION OF THE DRAWINGS

Figure 1:
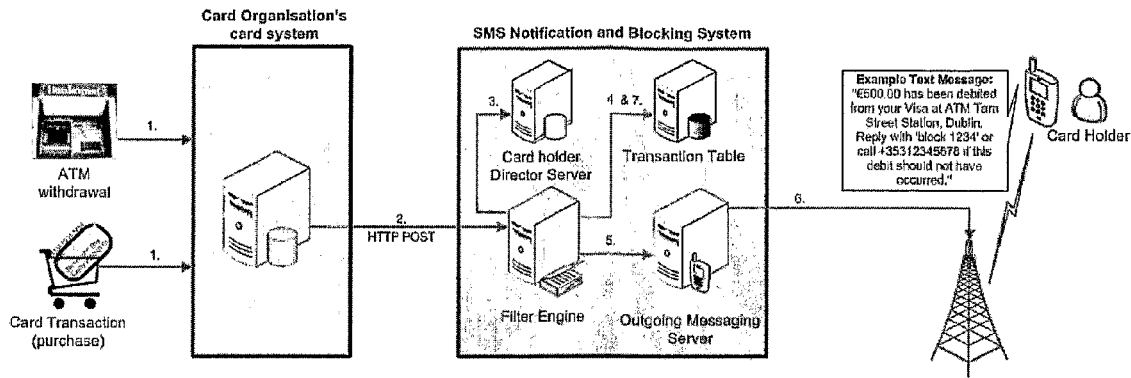
FIG. 1 is a card transaction SMS notification system overview according to an embodiment of the present invention.

Several features are firstly considered, which are provided herein by way of example only and in a non-limitative capacity, and which are capable of implementation in alternative embodiments of the present invention. Specific example embodiments are considered in relation to the accompanying Figures thereafter.

Transaction notifications may be delivered to the cardholder's phone either as a Short Message Service (SMS) message, Wireless Access Protocol (WAP) Push or as an Interactive Voice Response (IVR) call. Each notification method may utilise and integrate with 3PP service providers to deliver notifications to, and receive input data from, cardholders. The notification method depends on cardholders' individual settings or the tenant's wide settings in the apparatus. Furthermore, the apparatus may send notifications to merchants about any fraudulent transactions, whereby fraudulent orders may be cancelled order before the goods have been taken away or despatched. The apparatus may integrate with merchant systems via HTTPS. It will be appreciated that other data protocols can be used such as HTTP, SOAP, SMTP (E-Mail), File interface, CORBA.

The apparatus may invoke the cardholder to dial an emergency number to reach an IVR application, or to send a SMS to, in order to immediately block a card, whenever the cardholder realises a card is lost or compromised, without or before receiving a transaction request.

The apparatus is capable of hosting multiple tenants on a single platform. A tenant can be financial institution, bank, credit card company, service provider or the like. The apparatus is adapted to process transactions from multiple tenants.

When the apparatus receives an incoming transaction, it identifies the tenant to whom the transaction belongs, based on the one of the following inputs:

Primary Account Number (PAN)

Sending authentication (username/password combination)

A PAN is unique globally across all tenants, so this number uniquely identifies the owning Tenant. Account numbers or rendered PANs are not unique globally, therefore user authentication is required to determine the owning tenant. Each transaction requests received by the apparatus must be owned by a registered tenant, and all transaction responses must be returned to the correct originating tenant. The apparatus must impose restrictions, to ensure that each tenant can only view, modify or use information relating to its Organisation Settings and cardholder information.

The apparatus supports multiple languages, thus allows the transaction requests and interruptions to be communicated and processed internationally, and also allows each tenant to specify that each cardholder shall receive notifications in their language of choice. Notifications can be configured and stored in the apparatus in the language(s) required by the tenant. The apparatus can also allow each tenant to include their own elements of corporate identity and/or branding, such as image files representing logos and the like, within notifications.

Each tenant must be defined in the apparatus and certain properties must be configured per tenant. The apparatus requires a card profile to be defined when applying Filter Engine (FE) Notification Rules transactions (e.g. transaction threshold rules) and in the Notification Server when notifying a transaction. A card profile can be defined per tenant and/or per cardholder. Although a card profile is needed by the apparatus, not every cardholder needs an individual profile in the apparatus. If an individual profile is not found, the system can use an Organisation Profile. A card profile could be:

A card profile for an individual cardholder.

A card profile re-used by multiple cardholders in the same organisation/Tenant.

The override profile and default profiles are features, which use organisation profiles to notify cardholders. The override profile feature allows a tenant to supply an organisation profile to be used as part of the transaction information received. If no individual profile can be found, then the override profile is used.

The default profile is used when no profile can be found for the individual or override profile. It is a fall-back profile which a tenant can use to ensure that all supplied transactions are notified. The default profile must be configured for the tenant in the apparatus. If no default profile is configured, then this feature is not used.

The apparatus stores the following information for each card profile, in a database:

| Parameter | Mandatory/ Optional | Parameter Format |
|---|---|---|
| Account Identifier | Mandatory | Alphanumeric |
| Namespace | Mandatory | Integer |
| Owning Organisation | Mandatory | Integer |
| Cardholder First Name | Optional | Alphanumeric |
| Cardholder Surname | Optional | Alphanumeric |
| Card Type | Mandatory | Alphanumeric |
| Currency | Mandatory | Decimal/Currency |
| Cardholder's Phone Number | Mandatory | Alphanumeric |
| Prompt Group ID | Mandatory | Integer |
| Notification Action (Always Send, Send When Pass Rules, Never Send) | Mandatory | Integer |

-continued

| Parameter | Mandatory/Optional | Parameter Format |
|---|---|---|
| Notification Method (Text Message (SMS), Phone Call (IVR), WAP Push) | Mandatory | Integer |
| Transaction Value Notification Threshold | Optional | Decimal/currency |
| Custom Field 1 | Optional | Alphanumeric |
| Custom Field n | Optional | Alphanumeric |

The custom fields allow tenants to store additional information for each cardholder. This information can be used in several ways by customised plug-ins of the apparatus.

If the Account Identifier is a PAN, then the namespace is a shared namespace. A shared namespace is shared among all tenants. The system has the possibility to render the PAN to ensure that PCI DSS Compliance is met. If the Account Identifier is an account number, then the namespace is specific to that tenant. A tenant-specific namespace is only used by that tenant. The last 4 digits of the Account Identifier are used in notifications outgoing to the cardholder. The full Account Identifier is never be used in outgoing notifications, for security purposes.

The Prompt group ID determines which language/dialect to use for this profile.

The Namespace identifies whether the Account Identifier of the card profile is unique globally, or tenant-specific. The apparatus is adapted to process transaction requests for payment cards, which are unique, regardless of tenant and issuing country. The apparatus is also adapted to process transaction requests for payment cards or account numbers, which are only unique to a specific tenant. The combination of namespace value and Account Identifier ensure unique identification of the card profile.

Credit card numbers which are guaranteed to be unique (e.g. the full PAN), are assigned a shared namespace within the system (i.e. a namespace will is common to all credit cards). Account numbers, which are only unique to a particular tenant, are assigned a tenant-specific namespace. Namespaces are system-wide in nature. A shared namespace takes the value of zero. Tenant-specific namespaces take the Organisation ID of the sending tenant as the namespace (e.g. tenant with Organisation ID 51 uses the namespace 51).

Notifications issued from the apparatus are fully customisable and can be processed to include relevant look and feel elements, such as image files, according to tenant requirements: any tenant integrating the apparatus can have notifications requests issued to their cardholders, which appear to be sent from the tenant rather than from the apparatus itself.

The apparatus can be configured to perform a default notification method per tenant. The apparatus supports alternative notification methods, in case of a failure to deliver a notification using the default notification method. If the apparatus cannot deliver the notification to a cardholder device for any reason, the system determines another cardholder device to send the notification to (if any further device is registered in the database) and may also query the card organisation (tenant) about alternative contact methods for the cardholder, to ensure that the cardholder is notified.

The method used to deliver the notification to the cardholder can be configured in a prioritised order. For a specific tenant or a specific cardholder, the apparatus can be configured to send the notification using different notification methods, depending on the different phone numbers, network addresses, email addresses and the like available for the cardholder, in case a number is unavailable or a response from the cardholder is not received within a configurable time.

Any given cardholder could for example make a mobile phone number, home phone number and an office phone number available to the apparatus. If a SMS notification is sent to the cardholder's mobile number, but no reply is received from the cardholder within a predetermined and configurable period of time, the notification will be attempted via an alternative notification method, e.g. by triggering an IVR call to the cardholder's home or office phone number. This feature ensures that the notification is delivered.

The notifications contains information about the value of the transaction, the location of the transaction and an option to block, and optionally also to allow, the transaction. It will be appreciated that the notification message may take the form of any type of electronic communication, for example electronic mail. The notification may contain a codeword, e.g. "block" or "allow", and an authentication number which, together with the cardholder's network address (e.g. mobile phone number), makes it possible to interrupt the transaction, block the card or allow the transaction to be processed.

The authentication code is generated by apparatus, in such a way as to link it with the cardholder's network address (e.g. phone number), which is itself is linked with the transaction.

The apparatus can process both positive and negative responses from the cardholder. The apparatus can be configured and integrated to block the transaction (real-time) or it can be configured to block the card for future usage, thereby preventing further card fraud. By allowing the transaction, the cardholder confirms that the transaction is legitimate.

An example of a SMS notification received by the cardholder at the time of a transaction, with the apparatus according to the present invention, could for instance read; "€ 350 will be debited from your <card type> at <name of terminal>, <name of location>. Reply with "block 1234" or call <phone number> if this debit should not occur. Reply with "allow 1234" if the transaction is legitimate".

The cardholder has the following options:
1. Reply to the SMS message with the codeword, e.g. "block" and the authentication number, e.g. "1234". The apparatus will receive this message and forward the blocking request to the card organisation's card system, which will in turn block the card for future usage. The cardholder will then receive a confirmation that the card is blocked for future usage.
2. Reply to the SMS message with the codeword, e.g. "allow" and the authentication number, e.g. "1234". The apparatus will receive this message and forward the allowing request to the card organisation's card system.
3. Call the <phone number> received in the notification. When calling this number, the call will be routed to an IVR, which will handle the blocking request automatically using speech recognition. The cardholder will be asked by the IVR to say the codeword and the authentication number. The IVR will then reply to the apparatus with the appropriate interrupt data, which the apparatus will subsequently forward as a blocking request to the card organisation's card system, and which will in turn block the card for future usage. If the IVR fails to understand the cardholder, the call will be routed to a customer care person in the card organisation.

An example of an IVR notification to the cardholder after a transaction has taken place, according to the present invention could be that the system makes an IVR call to the cardholder's phone number. The Phone number can be provisioned in the system for that cardholder or it can be present in the incoming transaction. The transaction comes in to the system and the system verifies that a notification should be sent. The cardholder will receive a call from the IVR application which plays a series of pre-recorded audio files notifying the cardholder of the transaction that has occurred and explaining the various options to the cardholder. The cardholder has the option to ignore the call and not answer, in which the system will register that the notification could not be delivered. The cardholder could answer the call, listen to the announcements, but ignore the IVR announcements and disconnect the call, if the transaction is a valid and legitimate transaction.

Example announcements could for example include: "(option A) To confirm that the transaction is a valid transaction please select digit 1 on your handset now, or (option B) to flag that the transaction is an invalid transaction and you wish to block your card, please select digit 9 on you handset now"

If option A is chosen, the IVR application can request an access code from the cardholder for authentication. Upon successful authentication the call is ended and the system does not act upon the transaction.

If option B is chosen, the IVR application can request an access code from the cardholder for authentication (speech recognition or validation questions can also be used). Upon successful authentication the system will receive the block request from the IVR (using the IVR interface) and will process the request. The card transaction is obtained from the transaction table for this mobile number.

Based on the mobile number received sent from the IVR and the verification code, the system will send a request to the card organisation's card system to block the transaction. The Card organisation's card system blocks the cardholder's card. An outgoing response SMS message is constructed in the incoming Messaging server (IMS) and is forwarded for delivery to the cardholder (Alternatively, the system can interface with IVR application). The system delivers the response message to the cardholder. The cardholder receives the response SMS message with the confirmation that the transaction was blocked and the card has been blocked (Alternatively, the IVR application to play an announcement confirming that the transaction was blocked and the card has been blocked).

The notification can also be delivered to the cardholder as a WAP Push (Service Indication) notification according to another aspect of the invention. Again, the filter engine component handles all card transactions and determines whether a notification should be sent to the cardholder or not. If the notification is to be sent, the system will initiate the sending of a WAP Push, with a URL link, to the cardholder's mobile phone number. The URL link will direct to a WAP page, for the cardholder's financial institution, where the cardholder can view the transaction and is presented with an option to confirm the transaction is valid or invalid and to block the card by selecting "accept" or "block" buttons. The cardholder can receive WAP delivery reports for the response answer message to the WAP Push notification. The system can support multiple WAP Push notifications and WAP pages supporting multiple languages. The cardholder can receive the WAP Push notifications and WAP pages in a preferred language.

Transaction notifications regardless of which notification method is used will expire after a configurable duration. This will occur when a cardholder does not respond, or is unable to respond to the notification. The expiry countdown starts from the time that a transaction is received in the system. If after the expiry time, there is still no answer, then it is unlikely the cardholder will answer. The system can report this situation back to the owning Tenant. The owning Tenant can then decide how they wish to proceed (e.g. if they wish to try contacting the cardholder directly). The system will expire transactions for which an answer has not been received after a configurable period of time. Each Tenant shall be able to specify individual expiry times. A different expiry time must be configurable per notification method. When a transaction is expired, the notification state and the expiry time must be updated. Expired notifications will be reported the external Tenant's system.

If a notification fails to be delivered, the system will retry to send the notification again. If a notification cannot be delivered to a cardholder, the system will try to deliver the notification again. The notification methods, SMS, IVR and WAP will provide the system with information, indicating why the notification could not be delivered, e.g. cardholder busy, no answer if IVR was used. The system will then be notified about this and will try to deliver the notification again at a later stage using the same notification method. If one notification method fails multiple times, the system will recognise this and deliver the notification using a different method, if applicable.

A further aspect of the invention provides a system and method of contacting an emergency phone number in order to block a card in the event that the cardholder discovers a card stolen. There are two options to block a card, either by calling an emergency number to be routed to an IVR, which will handle the blocking request automatically using speech recognition, or by sending a SMS.

When calling the emergency number, the cardholder will be asked by the IVR to say the codeword, card number, and a personal PIN number. The IVR will then notify the system with the action to block the card which will then forward the request to the card organisation's card system, which will in turn block the card for future usage. If the IVR fails to understand the cardholder, the call will be routed to a customer care person in the card organisation.

When sending a SMS to block the card, the cardholder will include a codeword, card number and personalised PIN.

There is also provided a computer program comprising program instructions for causing a computer program to carry out the above method that may be embodied on a record medium, carrier signal or read-only memory.

The card organisation's card system will integrate to the card organisation system using HTTP POST, HTTPS POST, SMPT, XML, or SOAP (other interfaces can also be supported). The system will receive a HTTP POST, HTTPS POST, SMPT, XML, or SOAP (or the protocol used) request from each card transaction.

The invention can also be integrated to an external system using the E-Mail Transaction Plug-in (SMTP). This interface allows the tenant to email a batch of card transactions to the system. The Email Transaction plug-in will be able to extract the transactions and input them into system. The system will then notify the cardholders.

The incoming E-mail will contain one or more electronic spreadsheet files, for example a Microsoft excel spread sheet or CSV file, containing the relevant information about the transactions. Each Microsoft Excel spreadsheet file can contain multiple transactions to be notified. Each row in the excel spreadsheet will represent a single transaction. The Email Transaction Plug-in parses the Microsoft Excel spreadsheets, reading up and processing each transaction row.

The Email Transaction plug-in assumes that excel file will have the rendered PAN, or any account identifier, in the Account Identifier column. The system has the possibility to render the PAN to ensure PCI DSS compliance. As a rendered PAN will not have a card profile in the system, the E-Mail plug-in will need to supply an override profile. Override profiles are used when no individual card profile can be found.

Based on which telephone number is populated in the Microsoft Excel Spreadsheet (mobile, home or office) a different override profile is chosen. For example if mobile number is populated then a profile that notifies using SMS will be chosen. For home number and office number, an IVR profile could be chosen. These profiles must have been defined for the namespace specific to that tenant. Once an override profile has been assigned the transaction will be forwarded into the system and the response code obtained. This response code will then be populated in the received transaction excel file. After all transactions in an email have been processed, then each received transaction excel file (updated with response codes) is populated in a reply E-Mail. The E-Mail is the sent back to the email address that sent the transactions. One mandatory element of the spreadsheet is the rendered PAN, the last four digits of which are used in the notification sent to the cardholder.

Override profiles are stored in the organisations specific namespace. So to find the profile, the system needs to know the sending organisation. The username and password in the excel file provides security and also identifies the sending tenant. Therefore the username and password are also mandatory fields in the spreadsheet.

The invention also allows to be used as fraud notification system. External systems performing fraud detection or on-line phishing analysis can be integrated to the system and allow cardholders to be notified via the invention's supported notifications methods. External systems can be integrated using system's E-Mail Transaction Plug-in to receive potential fraudulent transactions and notify the cardholders/end users using the information received in the incoming transaction files. In this configuration, there is limited provisioning required in the system.

The system can be integrated to merchants via an external system in order to notify cardholders about transactions that have occurred at various merchants. The system generates Call Data Records (CDR) for all notifications issued by the system. These CDR's allows the system to charge merchants for the notifications and thereby avoid any cost for the cardholder or card organisation.

The system allows for integration to multiple systems within the same financial organisation (tenant). The system can integrate to any system within an organisation using the available and exposed interfaces. When integrating an external system to the invention a parameter called "Source System ID" is set uniquely per system. When a card transaction is received the invention, the "Source System ID" will identify what external system the transaction originated from. For example, the system could be a credit card system, ATM system, Laser Card System, etc, and the "Source System ID" would be unique per system. This will allow the invention to distinguish between what system it received the transaction from, and also ensure that the response to the correct system. The invention is also flexible enough to send the response to a different external system than the originating system if required. This will allow a transaction originating from the for example a Credit Card system that is marked as fraudulent by the cardholder to send the cardholder's response back to he Financial Institution's Fraud System instead of back to the Credit Card System. Setting the "Destination System ID" parameter controls the response destination. The Destination System ID" can be set based on different events that occur in the invention. Depending on different events, or in this case the response from the cardholder, e.g. a blocked transaction will be sent to the financial institution's fraud system, while a valid transaction will be sent back to the originating system. Basically the call flow is event driven and can be configured within the system by changing the Destination Source ID with the system for certain event criteria.

The system will be able to generate periodic reports to individual tenants of the system. Periodic reports will include all transactions which have changed state since the last report was generated for that tenant. Change of transaction state could for example be when a delivery report is received, or a cardholder answers. Transactions to be reported will be read up and sent to the event reporting component. Reports will be generated on a configurable periodic basis. All organisations with transactions that have changed state since the last periodic report shall receive a report. A report will be generated on a per Tenant basis i.e. one report to each Tenant with transactions to be reported. Reports are stored securely and separate for each tenant and will only contain the transactions for that organisation. No Tenant is able to see the transaction information for another organisation. Notifications will be considered to have changed state when the following states occur:

Successful notification (successful delivery of notification)
Failed notification (failed delivery of notification)
Positive customer answer
Failed customer answer
Transaction Expired Some events require real-time reporting to the owning Tenant. Rather than wait for the next reporting period, the system can report individual events to the Tenant as they happen. Events could be when a notification was delivered, cardholder answer received etc. How the events are reported depends on the organisations event settings. Different events can be reported to the same Tenant in different ways. For example, Tenant 1 wants to receive positive answers as emailed excel files, but negative answers should be sent as HTTPS Post, or other interfaces, to their fraud systems. The event reporting component supports this functionality.

This component can report individual events or groups of events (bulk report). The periodic reporting component uses this component to bulk report a group of events. It shall be possible to report individual events to the Tenant. It shall be possible to report on the following event types:

Successful notification
Failed notification
Positive cardholder answer
Positive cardholder answer for an expired Verification Code
Negative cardholder answer
Negative cardholder answer for an expired Verification Code
Expired transaction
Bulk report Depending on the event it shall be possible to report to different systems for the same tenant. Each system may use its own plug-in. The system supports the following reporting methods.

Reporting via HTTPS post
Reporting via Email

Typically tenants have multiple systems which are used for card processing. For example, it is usual to have separate systems for processing credit cards and debit cards. The system supports an additional parameter in the submitted transaction called the Originating System ID. The originating system ID is used by the Tenant to identify which of its systems originated the transaction (i.e. credit card or debit card system). When generating event reports back to the Tenant, the combination of the event and the originating system ID are used to determine where the event report should be sent.

How to report and what system to report to, shall be decided from the following information:
Owning Tenant
Originating system ID (received in the incoming transaction)
The event type
If the originating system ID parameter is not provided in the incoming transaction information then the "default" originating system ID will be used.
A "default" Originating System ID will exist for each tenant. If the system can not determine how to report based on the Originating System ID in the original transaction, then the "default" settings for that tenant will be used.
Bulk reporting is when the system wants to report a group of events all at once. As for individual event reporting, where/how to send the report depends on the originating system ID and the event type. For Bulk reporting the system will use the "Bulk Report" event type and the "default" originating system ID to decide the plug-in and address to use. For Bulk reports the "default" originating system ID and the bulk report event type will be used. The Event Reporting component shall be flexible in design allowing addition of new events and originating systems while service is live.
Reports can be delivered to the tenants organisation either using an outgoing HTTPS Report Plug-in or and outgoing E-Mail reporting plug-in. The Outgoing HTTPS Reporting Plug-in shall report the following information:
Account Identifier
Phone number used to notify the cardholder.
Current date time
Org Transaction ID
System Organisation ID
Answer i.e. positive or negative
The E-Mail report plug-in will deliver the reports in a Microsoft Excel spreadsheet, or other suitable spreadsheet format, via E-Mail to the receiving organisation, and contains the following information:
Account Identifier (Card Number/Account Number/Rendered PAN/Full PAN (not rendered). Whichever was received in the original transaction request)
Transaction Value
Number Notified
Notification Method
Notification State
Notification Time
Delivery Time
Answer Time
Expiry Time
Custom Field 1
Custom Field 2
Custom Field 3
Custom Field 4
Custom Field 5
Custom Field 6
Custom Field 7
Custom Field 8
Custom Field 9
Custom Field 10

The email address to which the report is to be sent shall be obtained from data provisioned in the system. The Number Notified field must contain the cardholder's number to which the notification was sent. The Notification State column entries must use the following terminology:
Successful notification
Failed notification
Positive customer answer
Failed customer answer
Expired If the number of events to be reported is greater than can be contained in one excel file, then multiple excel files shall be attached to the report email.

All transactions passing through the system is recorded by the system. A Tool called Transaction Trace Tool is available for the tenants to trace any transaction belonging to their organisation. The Transaction Trace Tool allows the tenant's customer care organisation to search any old transactions that has been passed though the system. All details recorded for the transaction can be viewed using the Transaction Trace Tool With reference to FIG. 1 now, an overview of a card transaction SMS notification apparatus is illustrated according to a first embodiment of the present invention.

An environment is shown, which comprises a plurality of network-connected data processing terminals, including a transaction terminal, such as a point-of-sale terminal or an ATM, a server and several further data processing terminals.

The apparatus comprises a logical component called the filter engine, which receives electronic authorisation requests from transaction terminals, wherein the request is for authorising the processing of an electronic transaction associated with a cardholder's card or account data. The filter engine also determines whether an electronic transaction notification should be sent to the cardholder or not. If an electronic transaction notification should be sent, the filter engine forwards the request to a messaging server that will handle the sending of the SMS notification to the cardholder's mobile (or cellular) phone number. The mobile number for all cardholders subscribing to this service is contained within the system.

The flow of the invention illustrated in FIG. 1 is as follows:
1. Any card transaction, whether it is an ATM withdrawal, a purchase in a shop using a card or an internet purchase using a card, is forwarded to the card organisation's card system.
2. The card organisation's card system will integrate to the card organisation system using HTTP POST, HTTPS POST, XML, or SOAP (other interfaces can also be supported). The system will receive a HTTP POST, HTTPS POST, XML, or SOAP (or the protocol used) request from each card transaction. The request will contain one or more of the following information: Card number, Transaction timestamp, Transaction ID (generated by card organisation), Transaction value, Terminal ID.
3. The request is received in the Filter Engine and will be validated and check against a set off rules to determine if a message should be sent out to the cardholder or not. The Filter Engine will retrieve the cardholder's mobile number and filter rules from the Cardholder Directory server. The cardholder's mobile number has already been provisioned in the system.
4. If an SMS notification should be sent out for the cardholder, the Messaging Server will update the Transaction Table.
5. A request will then be sent to the Messaging Server.
6. The Messaging Server will interface with the Mobile Network through an SMS Provider or a Mobile Operator to send out the SMS Notification to the cardholder's mobile number.
7. On successful notification delivery, the Transaction Table will be updated again.

The cardholder has the following options:
1. Ignore the notification, if the transaction is a valid and legitimate transaction.
2. Reply to the SMS message with the codeword, e.g. "allow" and the authentication number, e.g. "1234" if the transaction is a valid and legitimate transaction. The system will receive the message allowing the transaction and forward the information to the card organisation's card system. The card is then still valid and can be used in the future.

3. Reply to the SMS message with the codeword, e.g. "block" and the authentication number, e.g. "1234". The system in question will receive this message and forward the blocking request to the card organisation's card system that will in turn block the card for future usage. The cardholder will then receive a confirmation that the card is blocked for future usage.

4. Call the <phone number> received in the notification (instead of the actual phone number being listed in the notification, the message could state that the cardholder should call the financial institution's customer care. It could be that the number would not be presented to prevent spoofing). When calling this number, the call will be routed to an IVR which will handle the blocking request automatically. The cardholder will be asked by the IVR to say the codeword and the authentication number or to key in a selected digit and code combination. The IVR will then reply to the system with the appropriate action which will then forward the request to the card organisation's card system, which will in turn block the card for future usage. If the IVR fails to understand the cardholder, the call will be routed to a customer care person in the card organisation.

Both blocking methods (option 2 and 3 above) are now explained in further detail.

Figure 2:
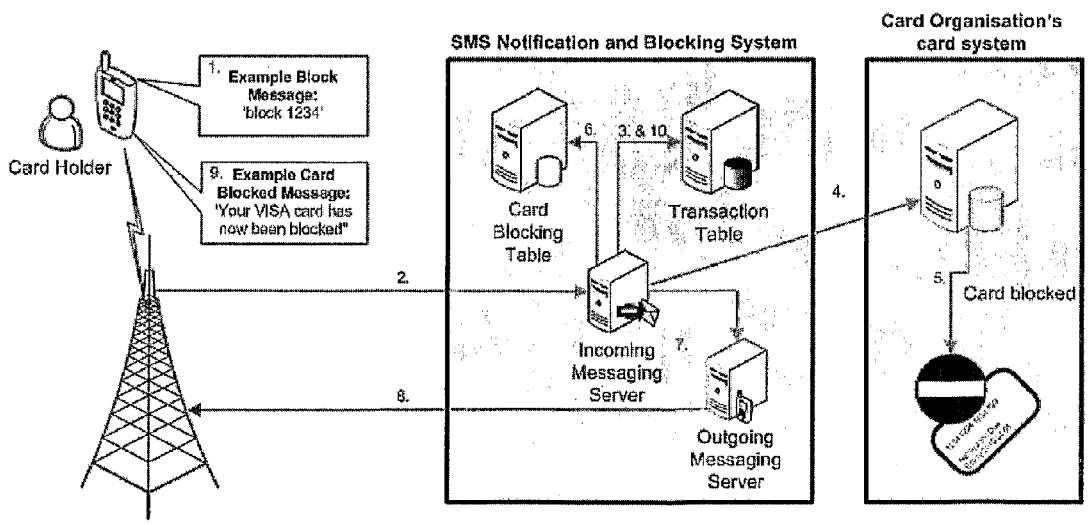
FIG. 2 illustrates the SMS Notification Blocking Method according to an embodiment of the present invention.

Referring now to the SMS Notification Blocking Method and with reference to FIG. 2. If the cardholder chose to block the card for future usage by replying to the SMS with the code word and the authentication number, the SMS will be routed back to the system. The system will handle the incoming request in the Messaging Engine, where it will process the request, and check that authentication number and mobile number matches the records in the system. If the request is valid, a card blocking request will be sent to the card organisation's card system.

The request will contain the card number, the original transaction ID and an action to block the card immediately. The card organisation will immediately block the card and prevent it for future usage.

The blocking flow is illustrated in FIG. 2 is as follows:
1. Cardholder sends SMS message with code word and authentication to the system.
2. The Incoming Messaging Server in the system receives the SMS notification.
3. The card transaction is obtained from the transaction table for this PIN code and mobile number.
4. The Card organisation's card system is notified of the card blocking event.
5. The Card organisation's card system blocks the cardholder's card.
6. The Card Blocking event is recorded in the Card Blocking Table.
7. An outgoing response SMS message is constructed in the incoming Messaging server and is forwarded to the outgoing Messaging Server for delivery to the cardholder.
8. The Outgoing Messaging Server delivers the response message to the cardholder.
9. The cardholder receives the response SMS message with the confirmation that the card has been blocked.
10. The response SMS message is updated in the Transaction table.

Figure 3:
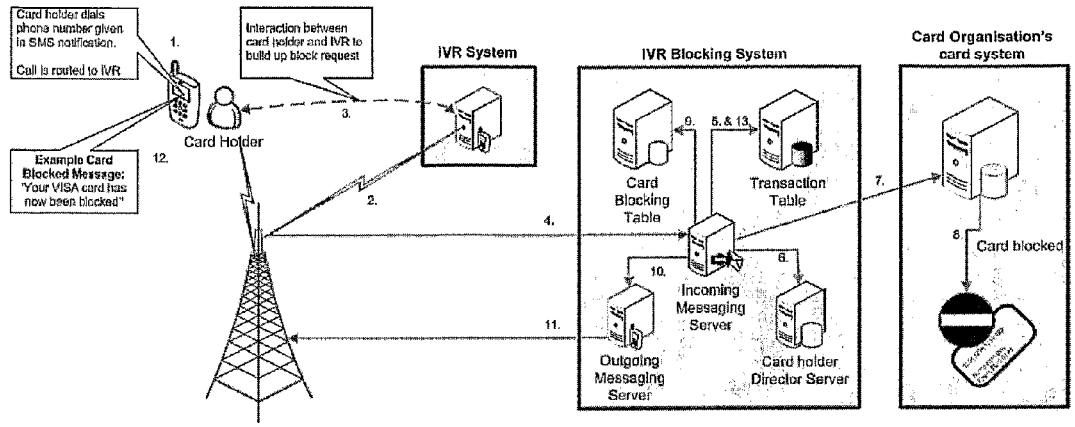
FIG. 3 illustrates the IVR Speech Recognition Card Blocking Method according to an embodiment of the present invention.

Referring now to FIG. 3 illustrates the IVR Speech Recognition Card Blocking Method according to another aspect of the invention. If the cardholder chose to block the card by calling the phone number that was given in the SMS notification, the cardholder's call will be routed to an Interactive Voice Response (IVR). The cardholder must make the call from the mobile phone that is registered in the system. The IVR will execute an application that is linked with the number dialed by the cardholder, referred to as the DNIS (Dialed Number Identification Service).

The general flow shown in FIG. 3 is as follows:
1. Cardholder dials the phone number given in the SMS transaction notification from the cardholder's mobile phone (the same as the SMS notification was received on).
2. The phone number is routed to an IVR and a connection between the cardholder and the IVR is established.
3. The cardholder interacts with IVR to obtain the required information. The IVR application will have pre-recorded audio files explaining the various options to the cardholder. The cardholder will be given the following options:
   A. "Do you wish to speak to a customer care staff of the card organisation, say 1"
   B. "Do you wish to block your card, say 2"
   C. "Do you wish to allow the transaction?"
      If option A is chosen, the cardholder is routed to customer care staff within the card organisation. The customer care staff will then go through standard security questions associated with blocking a card.
      If option B is chosen, using speech recognition, the IVR will request the cardholder to state his or her first name and sir name. The IVR will request confirmation if the name is correct. The IVR will the request the codeword and the authentication number that was in the SMS notification.
      If the IVR understands the cardholder's voice (it will ask for confirmation after each entry), the system will generate a request to be sent to the IVR Card Blocking System (the system in question). The request will contain the following information: Cardholder's first name, Cardholder's sir name, Cardholder's Mobile number (obtained from the call), The codeword (e.g. block), The authentication number (e.g. 1234), Transaction number used in the IVR.
   D. The system will receive the block request from the IVR in the Incoming Messaging Server (using the IVR interface) and will process the request.
   E. The Incoming Messaging Server will update the Transaction Table, but also retrieve the authentication number relevant for this transaction.
   F. Based on the mobile number sent from the IVR, the Incoming Messaging Server will request the cardholder's name from the Cardholder Directory Server, and compare the name from the Cardholder Directory Server and the one received in the IVR block request, if a match, the Incoming Messaging Server will compare the authentication number received from the IVR request to the one stored in the Transaction Table (all data is encrypted, and a key is required to retrieve this information).
   G. If the authentication numbers matches, the Incoming Messaging Server will send a request to the card organisation's card system to block the message.

H. The Card organisation's card system blocks the cardholder's card.
I. The Card Blocking event is recorded in the Card Blocking Table.
J. An outgoing response SMS message is constructed in the incoming Messaging server and is forwarded to the outgoing Messaging Server for delivery to the cardholder.
K. The Outgoing Messaging Server delivers the response message to the cardholder.
L. The cardholder receives the response SMS message with the confirmation that the card has been blocked.
M. The response SMS message is updated in the Transaction table.

Figure 4:
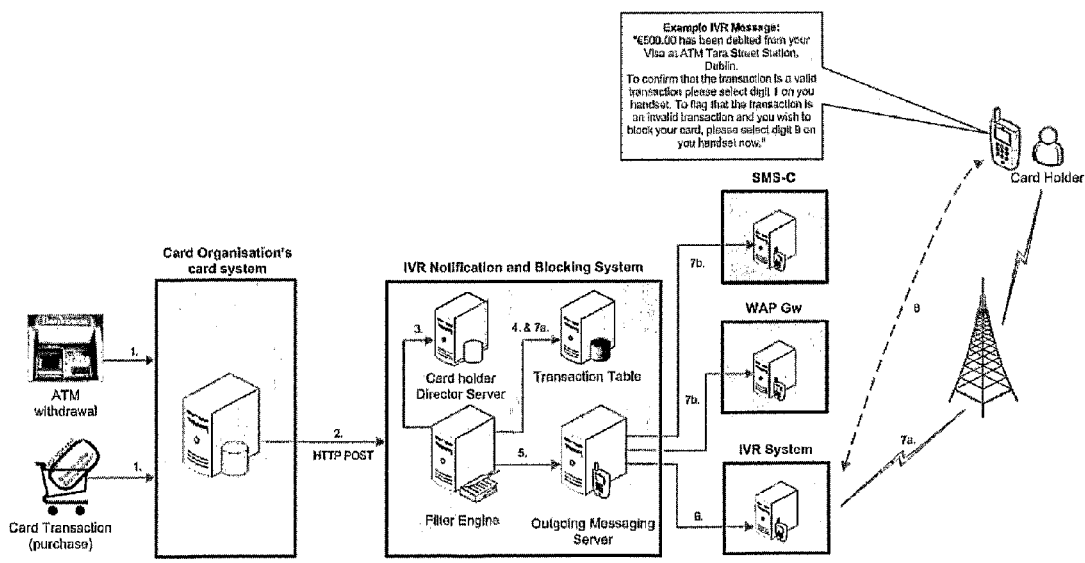
FIG. 4 illustrates a card transaction IVR notification system overview according to an embodiment of the present invention.

Referring now to FIG. 4 illustrates the IVR notification according to another aspect of the invention. Again, the filter engine component handles all card transactions and determines whether a notification should be sent to the cardholder or not. If the notification is to be sent, the filter engine will forward the request to a messaging server that will initiate the Interactive Voice Response (IVR) to make an outgoing call to the cardholder's mobile or fixed line phone number. The IVR can play the announcements in the cardholder's preferred language.

The IVR application will return a delivery report to the system confirming a successful outgoing call to the cardholder. If the outgoing call fails to connect with the cardholder, the system can send a notification by an alternative method such as SMS or WAP Push.

The cardholder will be played a series of announcements informing the cardholder of the transaction and offering the cardholder the option to confirm the transaction is valid or invalid and to block the card by number of alternative methods. The IVR application can provide the following alternative methods for responding to the notification:

a) The cardholder can respond by selecting a configurable number/digit key to confirm the transaction is valid or invalid and to block the card. If the cardholder does not provide any input into the IVR within a defined time, the call can be routed to the customer care of the cardholder's tenant. Furthermore, it is possible for the cardholder to press a configurable number/digit or key on the phone to be transferred to the customer care of the Tenant.

b) The IVR can use voice recognition software to authenticate the cardholder based on previous authenticated calls to the cardholder. The IVR application will then ask the cardholder to respond to the notification by answering to the options to confirm the transaction is valid or invalid and to block the card.

c) Furthermore, the IVR can authenticate the cardholder based on information stored in the system or available in the IVR by asking the cardholder to answer a series of validation questions e.g. asking the cardholders name, date of birth etc.

The general flow shown in FIG. 4 is as follows:
1. Any card transaction, whether it is an ATM withdrawal, a purchase in a shop using a card or an internet purchase using a card, is forwarded to the card organisation's card system.
2. The card organisation's card system will integrate to the card organisation system using HTTP POST (although other interfaces can also be supported such as HTTPS POST, SMTP (E-Mail), Microsoft Excel Spreadsheet, SOAP, etc). The system will receive a HTTP POST request from each card transaction. The request will contain one or more of the following information: Card number, Account Number, Transaction timestamp, Transaction ID (generated by card organisation), Transaction value, Terminal ID, Acquirer ID (ID of financial institution).
3. The request is received in the Filter Engine and will be validated and checked against a set off rules to determine if a message should be sent out to the cardholder or not. The Filter Engine will retrieve the cardholder's mobile number and apply the filter rules for the cardholder stored in the Filter Engine (or the filter rules defined for the default profile used). The cardholder's mobile number has already been provisioned in the system, or it coming in to the system in the incoming transaction.
4. If an IVR outgoing call should be made to the cardholder, the Notification Server will update the Transaction Table.
5. A request will then be sent to the Messaging Server.
6. The Messaging Server will interface with the IVR to make an outgoing call to the cardholder's mobile number.
7. a. On successful outgoing call connection, a delivery report will sent from the IVR application to the system reporting the successful connection, and the Transaction Table will be updated again.
   b. If the outgoing call connection is not successful (i.e. cardholder not unreachable), then the IVR application will send a delivery report to the system informing of the unsuccessful connection, and the system can retry the notification using an alternative method (e.g. using SMS or WAP, etc)
8. The cardholder has three options:
   1. Ignore the IVR announcements and disconnect the call, if the transaction is a valid and legitimate transaction. The system will not act upon the transaction.
   2. Upon listening to the announcements informing of the transaction and the available options, the cardholder can select a configurable number/digit key confirming the transaction as a valid transaction. The system will not act upon the transaction.
   3. Upon listening to the announcements informing of the transaction and the available options, the cardholder can select a configurable number/digit key flagging the transaction as an invalid transaction. The system in question will receive this message from the IVR and forward the blocking request to the card organisation's card system that will in turn block the transaction and block the card for future usage. The cardholder will then receive a confirmation that the transaction is blocked and the card is blocked for future usage.

The blocking method (option 3 above) is now explained in further detail.

Figure 5:
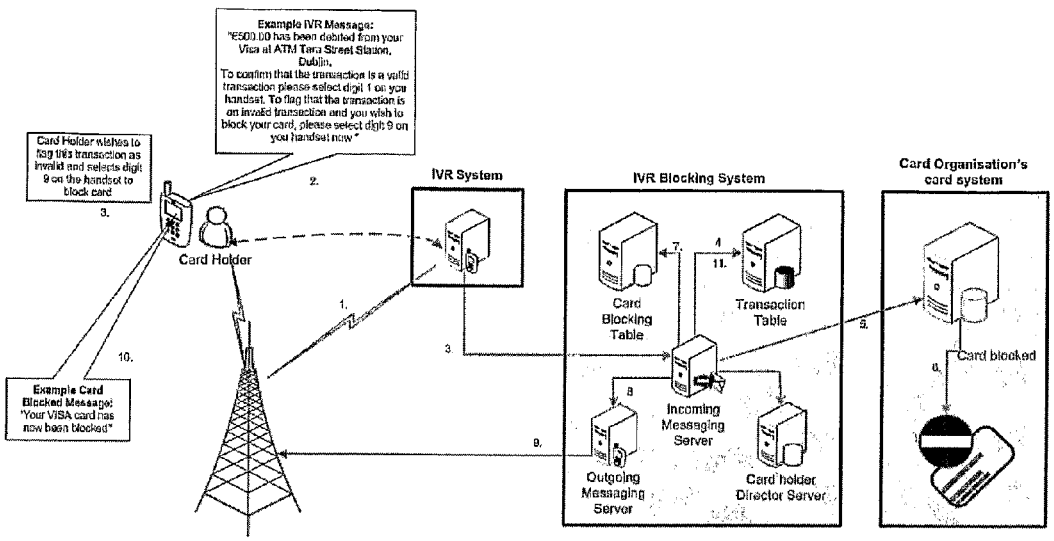
FIG. 5 illustrates the IVR Card Blocking Method according to an embodiment of the present invention.

The general flow shown in FIG. 5 is as follows:
1. Cardholder receives a call from the IVR application which plays a series of pre-recorded audio files notifying the cardholder of the transaction that has occurred and explaining the various options to the cardholder.
2. The cardholder will be given the following options:
   A. "To confirm that the transaction is a valid transaction please select digit 1 on your handset now"
   B. "To flag that the transaction is an invalid transaction and you wish to block your card, please select digit 9 on you handset now"
   If option A is chosen, the IVR application can request an access code from the cardholder for authentication. Upon successful authentication the call is ended and the system does not act upon the transaction.

3. If option B is chosen, the IVR application can request an access code from the cardholder for authentication (speech recognition or validation questions can also be used). Upon successful authentication the system will receive the block request from the IVR in the Incoming Messaging Server (using the IVR interface) and will process the request.
4. The card transaction is obtained from the transaction table for this mobile number. The Incoming Messaging Server will update the Transaction Table.
5. Based on the mobile number sent from the IVR and the verification code, the Incoming Messaging Server will send a request to the card organisation's card system to block the transaction.
6. The Card organisation's card system blocks the cardholder's card.
7. The Card Blocking event is recorded in the Card Blocking Table.
8. An outgoing response SMS message is constructed in the incoming Messaging server and is forwarded to the outgoing Messaging Server for delivery to the cardholder (Alternatively, the system can interface with IVR application).
9. The Outgoing Messaging Server delivers the response message to the cardholder.
10. The cardholder receives the response SMS message with the confirmation that the transaction was blocked and the card has been blocked (Alternatively, the IVR application to play an announcement confirming that the transaction was blocked and the card has been blocked).
11. The response SMS (IVR) message is updated in the Transaction table.

Figure 6:
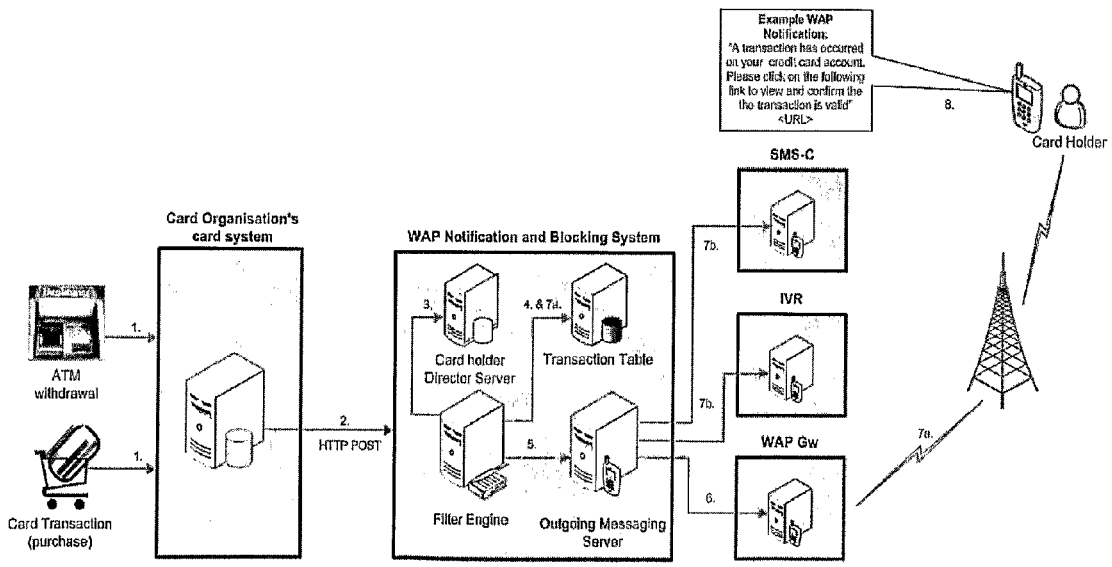
FIG. 6 illustrates a card transaction WAP notification system overview according to an embodiment of the present invention.

Referring now to FIG. 6 illustrates the WAP Push (Service Indication) notification according to another aspect of the invention. Again, the filter engine component handles all card transactions and determines whether a notification should be sent to the cardholder or not. If the notification is to be sent, the filter engine will forward the request to a messaging server that will initiate the sending of a WAP Push, with a URL link, to the cardholder's mobile phone number. The WAP gateway will return a delivery report to the system confirming a successful delivery of the WAP Push notification to the cardholder. If the WAP Push notification fails to be delivered to the cardholder, the system can send a notification by an alternative method such as SMS or IVR. The URL link will direct to a WAP page, for the cardholder's financial institution, where the cardholder can view the transaction and is presented with an option to confirm the transaction is valid or invalid and to block the card by selecting "accept" or "block" buttons. The cardholder can receive WAP delivery reports for the response answer message to the WAP Push notification. The system can support multiple WAP Push notifications and WAP pages supporting multiple languages. The cardholder can receive the WAP Push notifications and WAP pages in a preferred language.

The general flow shown in FIG. 6 is as follows:
1. Any card transaction, whether it is an ATM withdrawal, a purchase in a shop using a card or an internet purchase using a card, is forwarded to the card organisation's card system.
2. The card organisation's card system will integrate to the card organisation system using HTTP POST (although other interfaces can also be supported such as HTTPS POST, SMTP (E-Mail), Microsoft Excel Spreadsheet, SOAP, etc). The system will receive a HTTP POST request from each card transaction. The request will contain one or more of the following information: Card number, Account Number, Transaction timestamp, Transaction ID (generated by card organisation), Transaction value, Terminal ID, Acquirer ID (ID of financial institution).
3. The request is received in the Filter Engine and will be validated and checked against a set off rules to determine if a message should be sent out to the cardholder or not. The Filter Engine will retrieve the cardholder's mobile number and apply the filter rules for the cardholder (or the filter rules defined for the default profile used) stored in the Filter Engine. The cardholder's mobile number has already been provisioned in the system, or it coming in to the system in the incoming transaction.
4. If a WAP Push notification should be sent to the cardholder, the Notification Server will update the Transaction Table.
5. A request will then be sent to the Messaging Server.
6. The Messaging Server will interface with the Mobile Network through a WAP Gateway Provider or a Mobile Operator to send out the WAP Push Notification to the cardholder's mobile number.
7. a. On successful outgoing call connection, WAP Push Notification delivery, a delivery report will be returned from the WAP gateway to the system reporting the successful delivery, and the Transaction Table will be updated again. b. If the WAP Push Notification delivery is not successful, then the WAP gateway will send a delivery report to the system informing of the unsuccessful WAP Push Notification delivery, and the system can retry the notification using an alternative method (e.g. using SMS or IVR, etc)
8. The cardholder has three options:
   1. Ignore the WAP Push notification, if the transaction is a valid and legitimate transaction. The system will not act upon the transaction.
   2. Open the WAP page from the URL link and if the transaction shown in the notification is valid, respond by selecting the "accept" button on the WAP page. The system will not act upon the transaction.
   3. Open the WAP page from the URL link and if the transaction shown in the notification is invalid, respond by selecting the "block" button on the WAP page. The system in question will receive this message from the WAP Gateway and forward the blocking request to the card organisation's card system that will in turn block the transaction and block the card for future usage. The cardholder will then receive a confirmation that the card is blocked for future usage.

The blocking method (option 3 above) is now explained in further detail.

Figures 7, 8:
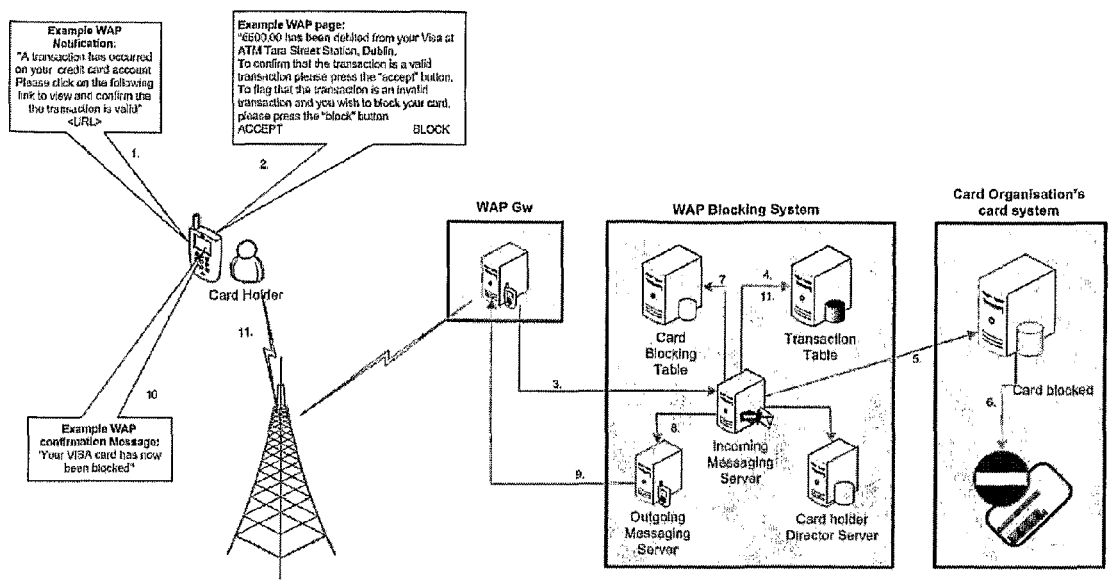
FIG. 7 illustrates the WAP Card Blocking Method according to an embodiment of the present invention.
FIG. 8 shows a list of Terminal ID's according to an embodiment of the present invention.

The general flow shown in FIG. 7 is as follows:
1. Cardholder receives a WAP Push notification with a URL link to a WAP page, in the cardholders preferred language, for the transaction that has occurred and providing the various options to the cardholder. The cardholder clicks on the URL link and is directed to the transaction WAP page.
2. The cardholder will be given the following options:
A. To confirm that the transaction is a valid transaction please press the button marked "accept" on the WAP page"
B. "To flag that the transaction is an invalid transaction please press the button marked "block" on the WAP page"

If option A is chosen, the WAP response is sent to the system and the transaction table cleared but the system does not act upon the transaction. A result WAP page will be presented confirming the "accept" option was received by the system. A WAP delivery report will also be received.

3. If option B is chosen, the system will receive the block request from the WAP Gateway in the Incoming Messaging Server and will process the request.
4. The card transaction is obtained from the transaction table for this mobile number. The Incoming Messaging Server will update the Transaction Table.
5. Based on the mobile number and the verification code, the Incoming Messaging Server will send a request to the card organisation's card system to block the transaction.
6. The Card organisation's card system blocks the cardholder's card.
7. The Card Blocking event is recorded in the Card Blocking Table.
8. A result WAP page will be forwarded by the incoming Messaging server to the outgoing Messaging Server for delivery to the cardholder.
9. The Outgoing Messaging Server delivers the result WAP page to the cardholder.
10. The cardholder receives the result WAP page confirming that the transaction was blocked and the card has been blocked. A WAP delivery report will also be received.
11. The result WAP page is updated in the Transaction table.

An important aspect of the invention is to technically implement the functionality described above to provide real-time fraud alerting. In these solutions, a notification is sent to the cardholder when a transaction on the card takes place, if certain criteria are met.

Typically, criminals will attempt to withdraw as much money as possible from the stolen cards over a given time. Typically money will be taken from several cards at the same terminal. To avoid suspicion after using one terminal for a short time, the gang will likely move to other terminals in the same area.

By identifying in near real-time the location and terminal where the criminal gang is illegally withdrawing money or purchasing goods, the financial institution is in a unique position to shut down terminals and/or direct police forces to where the gang is operating.

The system monitors incoming blocking SMS messages from cardholders. If a number of blocking texts are received for a particular terminal within a short period of time (say 10-20 minutes), the system will immediately alert the financial institution or a monitoring station.

If a card is blocked by the card user, the system will store certain information in a Card_Blocking table. This table can contain the following information.
 Terminal ID
 Terminal Type (ATM, POS, etc)
 Longitude of terminal
 Latitude of terminal
 Timestamp for blocked transaction
 Amount deducted for blocked transaction
 Currency of amount deducted (€, £, $, etc)
 Card organisation's card system transaction id
 Application transaction id
 Card Number for blocked card In order for the service to work, the name and address of all terminals issued within a country must be provisioned in the system along with the terminal type (shop merchant terminal, ATM, terminal used for internet transactions).

All terminals will be "geocoded" (can also be done based on the address) which include storing the longitude and latitude of each terminal. When a transaction is reported for a card blocking event occurring at a particular terminal, the terminal longitude, latitude is needed to search for other blocking transactions on terminals within a radius of the terminal.

The service will store each terminal's description, longitude and latitude in a separate table called "Terminal_Id". This table will be queried prior to updating the "Card_Blocking" table. The Terminal_Id table will comprise of the following columns:
 Terminal ID
 Terminal Description
 Longitude of terminal
 Latitude of terminal The financial organisation or card organisation will be held responsible for maintaining the Terminal_Id table. If no entry for a certain terminal can be found, the longitude and latitude will be left blank.

The system of the present invention will continuously calculate the number of frauds per terminal and display this information on a screen for a fraud surveillance centre to monitor. The system offers various different display options and search options:
 Possibility to configure the system only to see any fraud alerts with a certain time limit, e.g. the last 10 minutes or last 5 hours
 It is possible to display the fraud alerts in a real-time view where the fraud alerts are not calculated or combined, but just a near real-time view of fraud alerts as they come in per Terminal ID. The Fraud Surveillance Centre will then always have the possibility to see where the latest fraud has occurred. Using this view it is also possible to view the card number used, the amount and the currency withdrawn.

Figure 9:
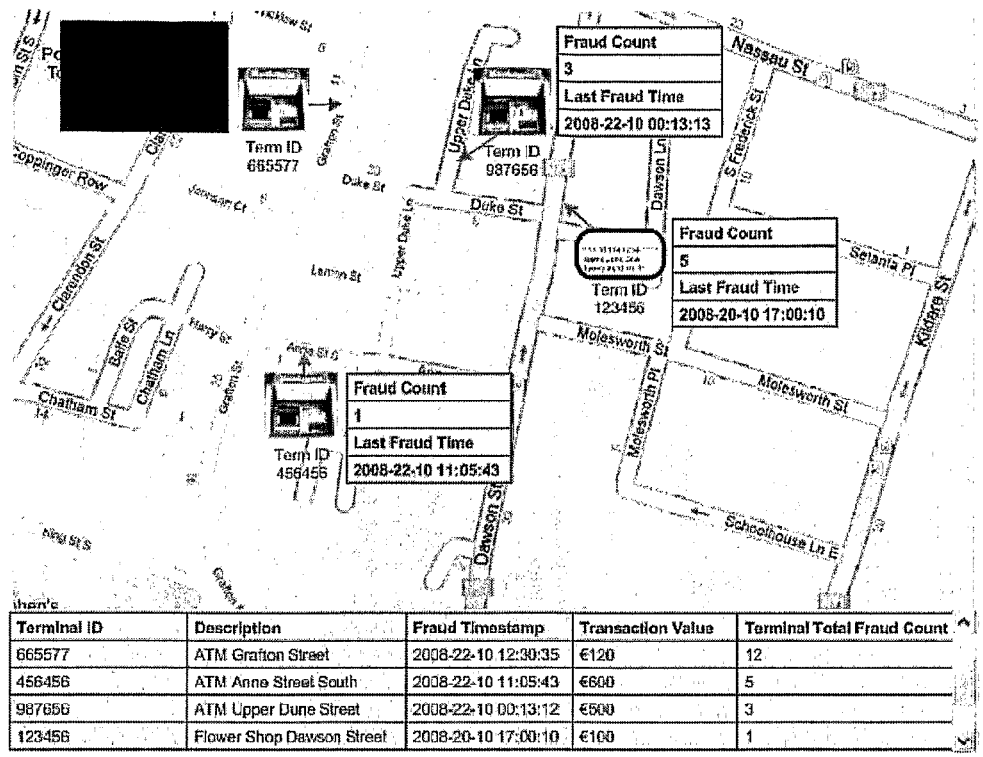
FIG. 9 shows a map view of Terminal ID's according to an embodiment of the present invention.

The system of the present invention can offer two types of displays. FIG. 8 shows the full list of all Terminal ID's (can be configured to be within a geographical area) that has been exposed to fraud. It will contain the count of number of fraud for each Terminal ID, but also a time field indicating when the latest fraud occurred on this Terminal ID. It is possible to select one Terminal ID to view further details available for this terminal. Example of this would be the possibility to view the history of fraud for this one Terminal ID. FIG. 9 is a map view showing all the Terminal IDs within a selected geographical area and the number of frauds occurred per terminal in this view. This view will also contain a timestamp of when the latest fraud happened on any given Terminal ID. It is possible to select one Terminal ID to view further details available for this terminal. Example of this would be the possibility to view the history of fraud for this one Terminal ID.

The service will offer a geographical map (which can zoom to street level) depicting the locations of terminals where frauds have been committed in recent time. This geographical map can be used by various monitoring stations. The service will also enable the users of the system the possibility to filter out older card blocking events and display only those events which have occurred in say the last 1, 12, 24 or 48 hour periods.

Each terminal comprises a colour code when displayed on the map indicating the number of fraudulent transactions which have occurred at that terminal during that time. E.g. the colour red may indicate a significant number of card blocking events from transactions made at that terminal. Orange and blue would indicate a lesser number of events at that coloured terminal. Displayed beside the terminal icon on the map will be the number of frauds which have occurred at that terminal in recent times. In addition a local cluster of terminals used to process card blocking events will be indicated with a colour coded circle. The total number of frauds which have been processed on the terminals within that circle will be displayed.

This enables the monitoring centre staff to identify problem areas very easily. The display will be constantly updated giving staff the latest information on the threat situation.

At the bottom of the screen there will be a scrolling list of recent card blocking events and the time the events occurred. When the service issues its automatic alerts the alert updates will be displayed at the bottom of the screen.

Similar alert displays as installed in the monitoring station can be installed in the financial institution giving the financial institution immediate access to the current threat situation. It also gives the financial institution the ability to see in near real time the actions the monitoring station and police forces are taking to address the problem.

Terminals where there are a number of instances of fraud, in a short space of time, will immediately get the Card Organisation's attention and they can work together with local police to catch criminals in the act.

The present invention also offers the possibility to store contact numbers for each shop merchant terminal to enable the service to the possibility to send SMS text alerts to all businesses operating within the alert area to be on their guard for suspected criminal gang working the area. Phone and SMS contact details for the 24 hour monitoring station can also be provided in the SMS alerts. This would further assist the monitoring station co-ordinate the efforts to locate the criminal gang and direct police efforts.

Figure 10:
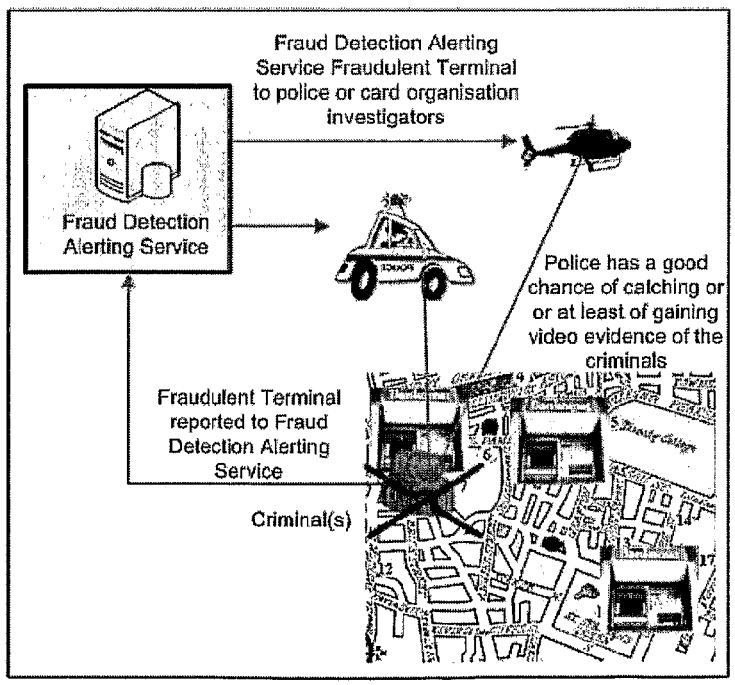
FIG. 10 illustrates a Fraud Detecting Alerting Service according to an embodiment of the present invention.

Referring now to FIG. 10 there is illustrated a fraud detection alerting service according to another aspect of the present invention. When frauds take place, the present invention will identify in what area the fraud has taken place and identify who the alert should be sent to. This service allows for local police or card organisation investigators to receive fraud alerts for terminals that are being exposed to fraud in their area directly as they happen. This increases the chances of catching the criminals in the act.

If the number of blocking events for terminals within this area is above a threshold then the service will automatically create an alert and issue this alert to a monitoring station.

The service is able to determine the terminal's location based on the longitude and latitude of the terminal, so the service will identify what monitoring station to send the alert to.

This integration can be as simple as to the mobile phone of the local police, or it can be to a navigation device such as a TomTom (or any suitable satellite navigation device), where a message will be constructed, coordinates set, to route the police to the terminal were fraud is being committed.

The invention also provides a fraud identifier feature. The purpose of this feature is to identify the person who committed fraud by checking all available data against a set of rules, to identify where the card details can have been compromised. A number of blocking events occurs. If a configurable number of blocked events occur generate an alert.

When an alert is generated, the first card will be checked to see if it was used together with the second card, and then to see if it was used together with the third card, and so. The main idea is to pinpoint where the actual card details were compromised in the first place and locate the fraudster, e.g. a shop assistant taking card details from a shop Point of Sale (POS). One possibility is for the banks and financial institutions to add an extra layer of security for POS terminals. The banks can force POS operators to identify themselves every time they use the terminal (prior to asking the customer to enter their details). It would then be possible to pinpoint who stole the card details.

The service is based on that all card transactions are forward to the system and any attempts of illegitimate transactions are immediately reported using the services described above.

If a card is blocked, the system will store certain information in a table called Blocking that may comprise the following information:

Terminal ID
Terminal Type (ATM, POS, etc)
Longitude of terminal
Latitude of terminal
Timestamp for blocked transaction
Amount deducted for blocked transaction
Currency of amount deducted (€, £, $, etc)
Card organisation's card system transaction id
Application transaction id
Card Number for blocked card The longitude and latitude for each terminal id will be retrieved from a separate table from the Terminal_Id table.

Figure 11:
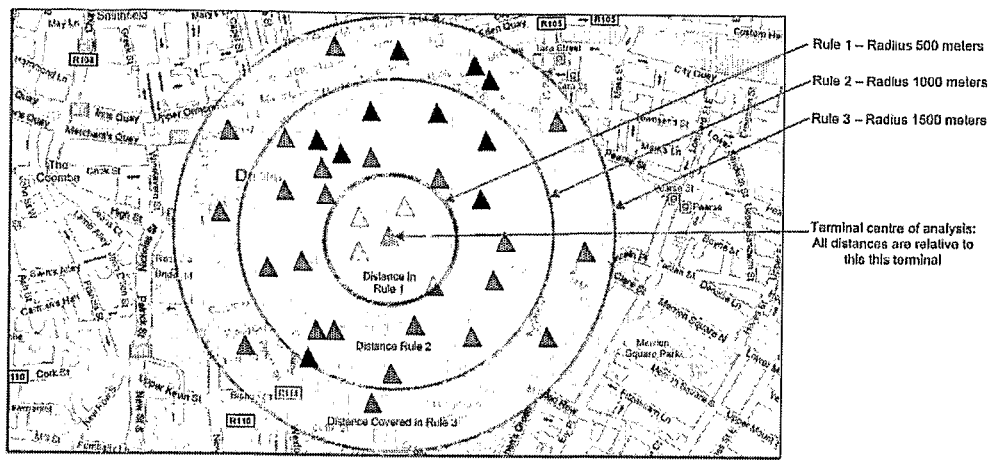
FIG. 11 illustrates a set of the different commands according to an embodiment of the present invention.

Another table called Query will contain all the rules used to determine whether a specific Terminal is more exposed of fraud than other terminals. The Query table will contain the following fields:

Rule Name—Name of the rule
Distance—Containing the distance from the original terminal the search should include
Time—The time in the past to limit the search
Trigger—This is the number of blocking events required before the rule triggers
Order—The order in which the rules should be executed
Alert Priority—The priority of the alert given if the rule triggers An example of a search is illustrated in FIG. 11. When fraud is reported for a terminal, the system will use this terminal as the centre for its calculations when it executes the various rules. The rules will check for other terminals in the same area that has been exposed to fraud, and it will check using different time intervals. The time interval here refers to how far back in time the search will check. So for example, the rules will check all terminals within a 500 meters radius for the last 30 minutes, and then maybe check again using the same radius, but going back further in time. The output of executing these rules against data available in the Blocking_Cards table will be stored in a table called Terminal_Alerts.

The fraud identifier feature can operate in the following manner:

Every time there is a new fraud reported for a terminal, a set of rules will be executed against this terminal to search for terminals which have been exposed to fraud in the geographical neighbourhood. The set of rules defined in the Query table in the prioritized order until the first rule produce a result. When a result is produced, this result will be stored in a Terminal_Alert table. Alert information (like terminal ID, blocking count, time interval) is captured for each terminal at configurable time intervals (30 minutes, 1 hour, 2 hours, 4 hours, 12 hours, 24 hours) in a table called Terminal_Alerts. The Terminal_Alerts comprises of the following columns:

Alert_id
Terminal_id
Initial_alert_time
Fraud_count
Alert_update_time

The Alert_Description table contains the following columns:
   Alert_id
   Alert_state—Acknowledged, Cleared, Active
   Description—Alarm Description
   Map_URL—URL for the map
   Alert_Handler—Name of person handling alert In the situation where an alert has already been created for this terminal ID the invention operates in the following manner. If this is a new alert within the same area, then update the existing alert. If it is a new alert outside the existing area, the search area is expanded to see if it is part of the same alert. This is needed to ensure that the alert is on the correct map. The new alert might be missing from the current map, so it may be required to expand the area to display for the map.

When an alert occurs, it is required to generate a map where the alert can be displayed. For example a request is sent towards a Microsoft software product. This will generate an URL for the map image. In order for the correct icons and data to be displayed on the map, it is required either Microsoft or MultiMap to do something on their side to use the correct icons. If a new alert comes in a new URL will need to be generated. It will be appreciated that it will be possible to Zoom and Pan in the map. The zoom is done by using the mouse to create a new square of the area that the user is interested in. The new coordinates are calculated by calculating the pixels from the mouse starting position and the end position against an offset at the bottom left part of the screen. This will give you the pixels required to retrieve the longitude and latitude.

A new request to the blocking table is then required to retrieve all the blocking events within this area. The search will be executed based on the longitude and latitude in the Blocking table. The invention can also provide an option to select the default display options. A summary can be default or not, this can be selected. The summary will give you the total number of alerts in the displayed area.

It will be appreciated that the invention is based on the fact that the best person to identify fraud is the cardholder herself/himself. If the cardholder is kept informed of transactions on their account in real-time, then they can immediately detect and flag transactions as being fraudulent. The card can then be blocked by the bank, significantly reducing the window the criminal has for fraudulent activities.

Once a blocking event is received the invention can identify at which terminal the fraudulent event took place and the geographical position of the terminal. The system of the present invention has a separate table where it stores details such as terminal ID for all blocked events. Each terminal ID is geo-coded to obtain longitude and latitude addresses for terminals (e.g. ATM, POS). From these reports can be generated showing the fraudulent transactions in an area, and tracking the route of a fraudster on a map. The invention provides a means to monitor incoming blocking events from cardholders. If a number of blocking events are received within defined time periods for a particular terminal or terminals in a defined area, and immediately alert the financial institution. The financial institution is now in a unique position to shut down the particular terminal and/or contact Police or Security agency to investigate in that area.

It will be appreciated that criminals will typically use stolen credit/debit cards from several different financial institutions. Each institution only sees fraudulent activity which occurs on cards belonging to their own customers. By deploying the invention as a hosted solution for banks, it is possible to receive blocking events for all the banks. This allows cross bank analysis to more effectively identify terminals and areas under attack in a very short space of time. Alerts can then be generated and sent to banks or a monitoring centre. This gives unprecedented early fraud detection which allowing for preventative actions and police involvement at the time the fraud is occurring.

The combination of this alert ability and mapping feature enables the deployment of a Police Fraud Detection Centre. All alerts are displayed in this centre with mapping giving a valuable overall real-time view of all fraud detected by the system of the present invention. The operations centre can track the path of criminals and identify the likely terminal to be hit next, as well as more effectively aiding Police or security personnel to apprehend the criminals. Images from the terminal of the criminals, maps highlighting where the fraud took place as well as any additional information can be sent out to the mobile of police officers on the ground in the area.

The following is a description of the invention in operation. Some criminals have built up a collection of cards from different financial institutions and are using them in Dublin to steal money. The criminals start to walk down Grafton Street in central Dublin. The first stop would be HMV followed by AIB, Harry Street as they make their way towards Brown Thomas. Allied Irish Bank, Bank of Ireland and Ulster Bank will receive the blockings and prevent further frauds on those cards. However individually they will have no knowledge about fraudulent activities on other institutions cards, When the number of blocking events for terminals within the Grafton St area is above a threshold then the system of the invention automatically creates an alert and issues this alert to a 24 hours monitoring service (or to Gardaí (Police) directly).

Figure 12:
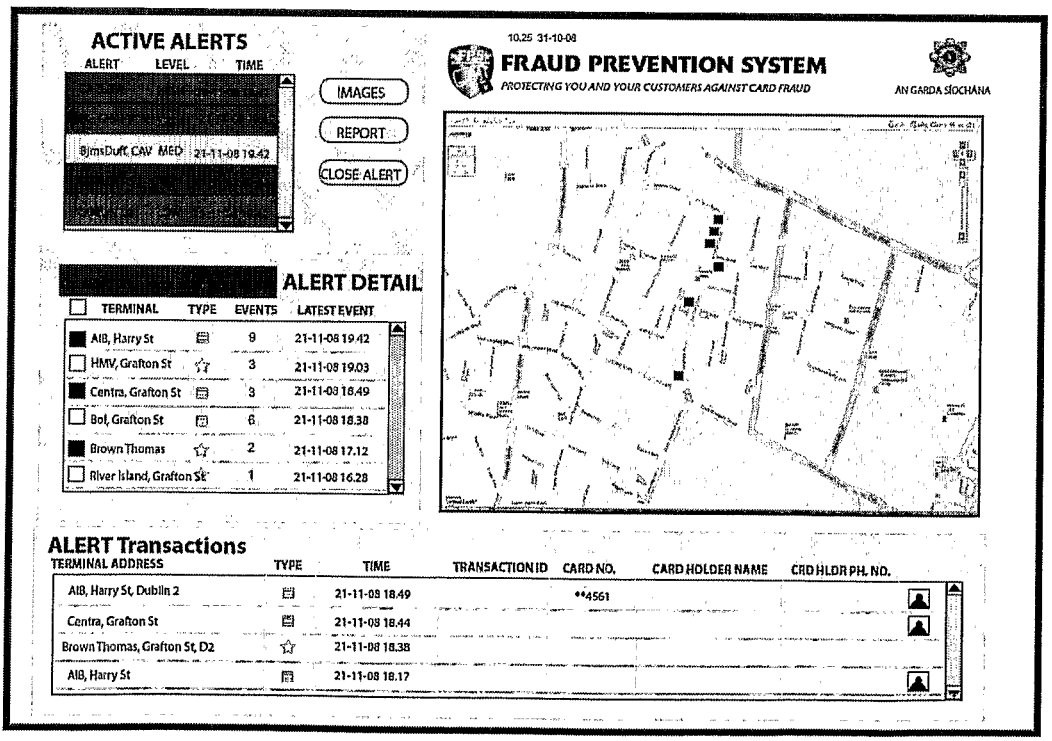
FIGS. 12 & 13 illustrate an example of an embodiment of the present invention in operation.

The alerts are displayed on a screen showing a specific area, in our example, the Dublin 2 Grafton Area is shown in FIG. 12. On the screen the active alerts can be seen and the operator has the opportunity to drill down and see alert details and transactions for the selected area. An alert on the same terminal will be pinned several times on the screen. The operators can easily assembly a report and alert the local Gardaí as well as the financial institutions whose terminals have been used to steal money.

Figures 13, 14:
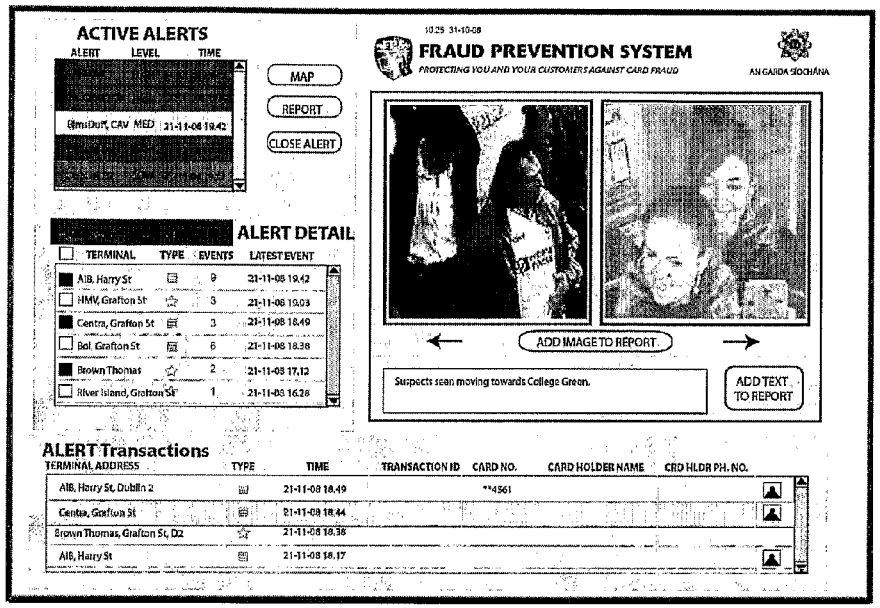
FIG. 14 illustrates the incoming E-Mail transaction Spreadsheet according to an embodiment of the present invention.

To further save time and resources a selection of potential suspects can be prepared at the 24 hour monitoring station. Most banks have digital cameras focused on every ATM. These images are transferred from the individual banks to a secure storage array hosted in a high security data centre. The monitoring system operator who sees the alert can drill into each blocking event and view the images of the people who performed the actual transaction, as shown in FIG. 13. The operator can scan through the images, select and store them in order to compare them with images from other blocking events which form part of this alert. Alternatively, a facial recognition system can be used with suspects compared with images of known criminals stored in the off-site database. In this way a selection of suspects can be created and forwarded to a mobile (cellular) phone distribution list of Gardaí working in that area. As a result, Gardaí on the ground can quickly identify and apprehend the suspects for questioning.

The 24 hour monitoring station will update the alert status in the system. For example should the Gardaí apprehend the criminal gang responsible for the alert the status of the alert and the blocking events which caused the alert will be updated to "resolved". This means that the alert is closed.

FIG. 14 illustrates the incoming E-Mail transactions interface. The Incoming FE Email Transaction plug-in will be able to extract the transactions and input them into the system. The system can then notify the cardholders. The E-mail will contain one or more spreadsheet files, for instance according to the Microsoft Excel format or spreadsheet format described above, containing the relevant information about the transactions. Each spreadsheet file can contain multiple transactions to be notified. Each row in the spreadsheet will represent a single transaction. The system Incoming FE Email Transaction Plug-in parses the spreadsheets, reading up and processing each transaction row.

The Incoming FE Email Transaction plug-in assumes that each file will have the rendered PAN in the Account Identifier column. As a rendered PAN will not have a card profile in the system, the plug-in will need to supply an override profile. Override profiles are used when no individual card profile can be found. Based on which telephone number is populated (mobile, home or office) a different override profile is chosen. For example if mobile number is populated then a profile which notifies using SMS will be chosen. For home and office an IVR profile could be chosen. These profiles must have been defined for the namespace specific to that tenant.

Once an override profile has been assigned the transaction will be forwarded into the FE (using the FE Java API), and the response code obtained. This response code will then be populated in the received transaction spreadsheet file. After all transactions in an email are processed, then each received transaction spreadsheet file (updated with response codes) is populated in a reply email. The email is the sent back to the email address that sent the transactions.

One mandatory element of the spreadsheet is the rendered PAN, the last four digits of which are used in the notification sent to the cardholder. Override profiles are stored in the organisations specific namespace. So to find the profile, the system needs to know the sending organisation. The username and password in the spreadsheet file provides security and also identifies the sending tenant. Therefore the username and password are also mandatory fields in the spreadsheet.

Figure 15:
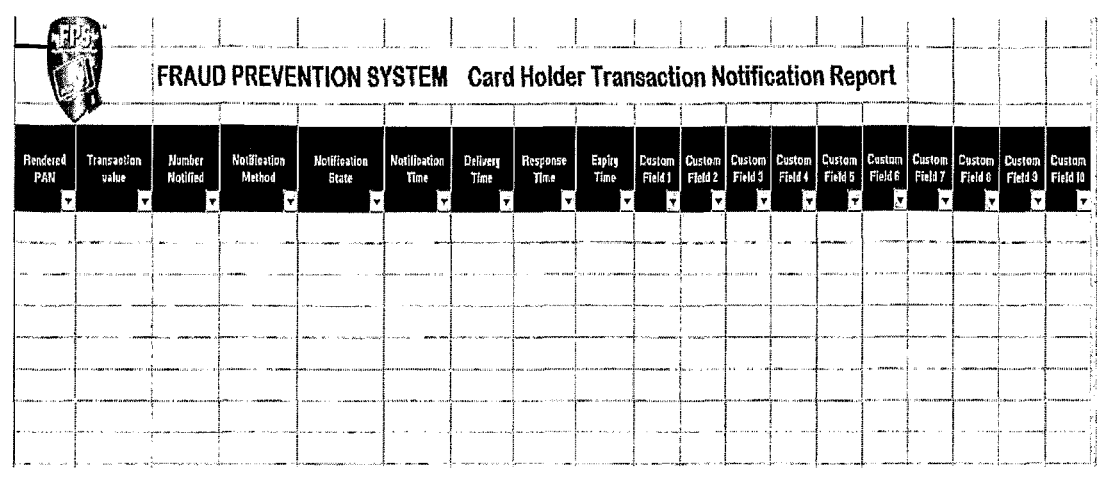

FIG. 15 illustrates an outgoing E-Mail Reporting spreadsheet. The system will be able to report events to Tenants by emailing a spreadsheet file, for instance again per the Microsoft Excel format. This Outgoing E-Mail Reporting plug-in receives the information to be reported and populates a spreadsheet file with same. It subsequently sends the spreadsheet file via email to the Tenant. The destination address of the email shall be as defined in the Organisation Event Settings. An Outgoing E-Mail Reporting plug-in shall be created for event reporting. The report shall be created as a spreadsheet file. The spreadsheet report template file to be populated shall be available on the system's file system. The report name shall take the name of the template spreadsheet file and append the current date time using the format YYYY-MM-DD_HH-MM-SS.

The spreadsheet file shall be populated with the entries which have changed state since the last report was generated. Each transaction to be reported shall be inserted as a row in the spreadsheet file. The report shall contain the following details about each transaction:
Account Identifier (Card Number/Account Number/Rendered PAN. whichever was received in the original transaction request)
Transaction Value
Number Notified
Notification Method
Notification State
Notification Time
Delivery Time
Answer Time
Expiry Time
Custom Field 1
Custom Field 2
Custom Field 3
Custom Field 4
Custom Field 5
Custom Field 6
Custom Field 7
Custom Field 8
Custom Field 9
Custom Field 10

The email address to which the report is to be sent shall be obtained from the provisioned Organisation Event Settings. The Number Notified field must contain the cardholder's number to which the notification was sent. Notification State column entries must use the following terminology:
Successful notification
Failed notification
Positive customer answer
Failed customer answer
Expired If the number of events to be reported is greater than can be contained in one spreadsheet file, then multiple spreadsheet files shall be attached to the report email.

It will be appreciated that key benefits for the system and method of the present invention can be summarised as follows:

1. All Card transactions over a configurable amount are monitored by the cardholder via a notification system, e.g. SMS, IVR (phone call) or WAP.
2. The Cardholder has the ability to block the card to prevent further fraud via e.g. SMS, IVR (phone call) or WAP.
3. The system is a registration based service. Only cardholders registered to the service will have the possibility to monitor transactions and block the card. The cardholder will in this way keep control of all card transactions when they happen, and can for example quickly discover that a charge has not occurred twice, or a charge that they are not aware of has occurred on their card.
4. The system significantly limits the time for which the card is available to the criminals to abuse.
5. It is possible for the financial institution to override the subscriber settings in the system and force a notification to be sent to the cardholder. For example, if an internal fraud detection system detects patterns of potentially fraudulent activity the system can be used to notify the cardholder.
6. It is possible to configure the send notification threshold transaction value on a card by card basis.
7. It is possible to flag a card to have a notification sent for all transactions regardless of value.
8. Cardholders can register to the service by sending a notification to the system of the present invention. This makes registration easy and ensures correct mobile number for system subscribers.
9. The system supports multi-lingual notifications for multiple tenants.
10. The invention allows for the result of one transaction originating from one external system within a tenant's organisation, and send a reply to another external system within the tenant's organisation.
11. The fact that notifications are only sent for transactions over a configurable amount will reduce the OPEX. The invention will filter out low value transactions which the financial institution deems unworthy of protecting.
12. The system will identify which terminal was used and where the terminal is located when the card is blocked. When several blockings have been made from one specific terminal or in a defined area the system will send the information to the local police/monitoring station. It is a great advantage to have a direct real-time co-ordination of all blocking activities for the whole country.

It will be appreciated that the system and method of the present invention operates on the basis that every card transaction is forwarded from the card organisation's card system to this system using HTTP POST, HTTPS POST, SMTP (E-Mail), XML, SOAP, etc. The interface to the invention is completely customisable, and the plug-in architecture allows the invention to be integrated to any system using any interface.

The application of an SMTP (E-Mail) interface supporting incoming transactions and outgoing reports for the integrated tenant makes the integration quick and easy, with minimal impact on the tenant being integrated and also it minimises the provisioning required in the system.

The system will attempt to re-deliver any notification that was not delivered successfully the first time. The system will ensure that the notification is delivered to the cardholder and if one notification method is failing to deliver the notification, the system can be configured to use an alternative notification delivery method.

It will be further appreciated that the invention can be provided as a hosted solution exceeding PCI compliance and using Oracle's secure vault database technology using a high security secure data centre, for example Eircom's secure database in Clonshaugh in North Dublin, Ireland. It is envisaged that the database will operate using Oracle DB. Other secure software hosting can also be used.

The benefit of the present invention is to halt fraud at an early stage to prevent further abuse of the cardholders and banks. The system of the invention saves money and time to track the fraud. Because the solution is hosted in an offsite high security datacentre, participating banks do not need to build up an expensive and time consuming solution on site. Financial institutions simply stream a feed of transactions over an encrypted VPN directly to the secure inventive system. This results in minimal deployment time and investment.

The invention also has the benefit in that allows to be utilised as a fraud notification system. For example, external systems performing fraud detection or on-line phishing analysis can be integrated to the system and allow cardholders to be notified via the invention's supported notifications methods. External systems can be integrated using system's E-Mail Transaction Plug-in to receive potential fraudulent transactions and notify the cardholders/end users using the information received in the incoming E-Mail Transaction files.

Having a centralised fraud detection service is very beneficial for all banks in Ireland, and outside of Ireland, since today there is no awareness of card fraud occurs in other banks. Such a centralised third party fraud detection service allows all banks to collaborate in a joint effort to prevent fraud while still maintaining complete confidentiality of the fraud level occurring in a particular bank. For example, thieves will use cards belonging to a number of institutions when defrauding using a particular terminal or terminals in an area. Each bank may become aware of attacks against its own customers when calls are made to customer care, but it is its only when attacks against customers of all banks are visible will the fraudsters activity become immediately visible. Gardaí can now be alerted and directed in near real time to the scene of the gang's activities. For the end customer it is an easy and secure way to control the use of the card at a minimum cost, since no major card charge will pass unnoticed.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In this specification the term "credit card" refers to credit cards (MasterCard®, Visa®, Diners Club®, etc.) as well as charge cards (e.g., American Express®, some department store cards), debit cards such as usable at ATMs and many other locations or laser cards or that are associated with a particular account, and hybrids thereof (e.g., extended payment American Express®, bank debit cards with the Visa® logo, etc.) and should be afforded the widest possible interpretation.

While the foregoing description makes reference to particular illustrative embodiments, these examples should not be construed as limitations. Not only can the inventive system be modified for other card numbered systems; it can also be modified for other computer networks or numbering schemes. Thus, the present invention is not limited to the disclosed embodiments, but is to be accorded the widest scope consistent with the description and/or drawings. The invention can be used for any notification, not only restricted to credit cards as defined above, but also covers real-time notifications of transactions that occur on any retail website or notifications of any internet purchase to the cardholder.

The invention is not limited to the embodiments hereinbefore described but may be varied in both construction and detail.

The invention claimed is:

1. A system for preventing electronic transaction fraud, comprising:
   a plurality of network-connected data processing terminals, including at least one server;
   means for receiving an electronic authorisation request at the server from a first data processing terminal, wherein the request is for authorising the processing of an electronic transaction associated with a cardholder's card data or account data;
   means for filtering the received request according to predetermined filtering criteria;
   means for identifying at least a second data processing terminal as a cardholder device;
   means for sending the request to the cardholder device, to notify the cardholder that processing of an electronic transaction is proposed, a parameter of which is said cardholder's card data or account data; and
   means for receiving interrupt data from the second terminal and for interrupting processing of the, or any further, electronic transaction with that card data or account data;
   wherein the first data processing terminal is selected from the group comprising an electronic point of sale terminal, an electronic card processing terminal, an automatic teller machine, a telephone, a cellular telephone, a radiotelephone, a portable computing device, a desktop computing device.

2. A system for preventing electronic transaction fraud, comprising:
   a plurality of network-connected data processing terminals, including at least one server;

means for receiving an electronic authorisation request at the server from a first data processing terminal, wherein the request is for authorising the processing of an electronic transaction associated with a cardholder's card data or account data;

means for filtering the received request according to predetermined filtering criteria;

means for identifying at least a second data processing terminal as a cardholder device;

means for sending the request to the cardholder device, to notify the cardholder that processing of an electronic transaction is proposed, a parameter of which is said cardholder's card data or account data; and means for receiving interrupt data from the second terminal and for interrupting processing of the, or any further, electronic transaction with that card data or account data;

wherein the first or second network is selected from the group comprising a public switched telephone network, a cellular telecommunication network, a wide area network, a local area network, a wireless local area network, a virtual private network and an interbank network.

3. A system for preventing electronic transaction fraud, comprising:

a plurality of network-connected data processing terminals, including at least one server;

means for receiving an electronic authorisation request at the server from a first data processing terminal, wherein the request is for authorising the processing of an electronic transaction associated with a cardholder's card data or account data;

means for filtering the received request according to predetermined filtering criteria;

means for identifying at least a second data processing terminal as a cardholder device;

means for sending the request to the cardholder device, to notify the cardholder that processing of an electronic transaction is proposed, a parameter of which is said cardholder's card data or account data; and means for receiving interrupt data from the second terminal and for interrupting processing of the, or any further, electronic transaction with that card data or account data;

wherein the plurality of network-connected data processing terminals includes at least one security terminal operated by a state, official or private security organisation and further comprising means to automatically communicate interrupt data to the security terminal whenever interrupt data is received from a second terminal for an electronic transaction, wherein the means to automatically communicate further comprises aggregating means for receiving the interrupt data and generating fraud reporting data.

4. The system according to claim 3, wherein the plurality of network-connected data processing terminals includes at least one security terminal operated by a state, official or private security organisation and further comprising means to automatically communicate interrupt data to the security terminal, whenever interrupt data is received from a second terminal for an electronic transaction and wherein the fraud reporting data corresponds to at least one selected from the group comprising a geographical position, a first data processing terminal type, a financial institution identifier, a merchant identifier, image data, audio data and video data, as a function of whether any such data is stored at the first data processing terminal and/or at the server in connection with the reported transaction.

5. The system according to claim 3, wherein the plurality of network-connected data processing terminals includes at least one security terminal operated by a state, official or private security organisation and further comprising means to automatically communicate interrupt data to the security terminal, whenever interrupt data is received from a second terminal for an electronic transaction and wherein the fraud reporting data corresponds to a combination of some or all of data corresponding to a geographical position, a first data processing terminal type, a financial institution identifier, a merchant identifier, image data, audio data and/or video data, as a function of whether any such data is stored at the first data processing terminal and/or at the server in connection with the reported transaction.

6. A system for preventing electronic transaction fraud, comprising:

a plurality of network-connected data processing terminals, including at least one server;

a server component configured to receive an electronic authorisation request at the server from a first data processing terminal, wherein the request is for authorising the processing of an electronic transaction associated with a cardholder's card data or account data;

a server component configured to filter the received request according to predetermined filtering criteria;

a server component configured to identify at least a second data processing terminal as a cardholder device;

a server component configured to send the request to the cardholder device, to notify the cardholder that processing of an electronic transaction is proposed, a parameter of which is said cardholder's card data or account data; and a server component configured to receive interrupt data from the second terminal and to interrupt processing of the, or any further, electronic transaction with that card data or account data;

wherein the first data processing terminal is selected from the group comprising an electronic point of sale terminal, an electronic card processing terminal, an automatic teller machine, a telephone, a cellular telephone, a radiotelephone, a portable computing device, a desktop computing device.

7. A system for preventing electronic transaction fraud, comprising:

a plurality of network-connected data processing terminals, including at least one server;

a server component configured to receive an electronic authorisation request at the server from a first data processing terminal, wherein the request is for authorising the processing of an electronic transaction associated with a cardholder's card data or account data;

a server component configured to filter the received request according to predetermined filtering criteria;

a server component configured to identify at least a second data processing terminal as a cardholder device;

a server component configured to send the request to the cardholder device, to notify the cardholder that processing of an electronic transaction is proposed, a parameter of which is said cardholder's card data or account data; and a server component configured to receive interrupt data from the second terminal and to interrupt processing of the, or any further, electronic transaction with that card data or account data;

wherein the plurality of network-connected data processing terminals includes at least one security terminal operated by a state, official or private security organisation and further comprising means to automatically communicate interrupt data to the security terminal, whenever interrupt data is received from a second terminal for an electronic transaction and wherein the fraud reporting data corresponds to a combination of some or all of data corresponding to a geographical position, a first data processing terminal type, a financial institution identifier, a merchant identifier, image data, audio data and/or video data, as a function of whether any such data is stored at the first data processing terminal and/or at the server in connection with the reported transaction.

* * * * *